United States Patent
Cheung et al.

(10) Patent No.: US 8,244,469 B2
(45) Date of Patent: Aug. 14, 2012

(54) COLLABORATIVE ENGAGEMENT FOR TARGET IDENTIFICATION AND TRACKING

(75) Inventors: Carol Carlin Cheung, Burlington, MA (US); Brian Masao Yamauchi, Boston, MA (US); Christopher Vernon Jones, Woburn, MA (US); Mark Bourne Moseley, Woburn, MA (US); Sanjiv Singh, Pittsburgh, PA (US); Christopher Michael Geyer, Arlington, MA (US); Benjamin Peter Grocholsky, Pittsburgh, PA (US); Earl Clyde Cox, La Crescenta, CA (US)

(73) Assignee: iRobot Corporation, Burlington, MA (US)

( * ) Notice: Subject to any disclaimer, the term of this patent is extended or adjusted under 35 U.S.C. 154(b) by 643 days.

(21) Appl. No.: 12/405,207

(22) Filed: Mar. 16, 2009

(65) Prior Publication Data

US 2010/0017046 A1     Jan. 21, 2010

Related U.S. Application Data

(60) Provisional application No. 61/036,988, filed on Mar. 16, 2008.

(51) Int. Cl.
*G05D 1/12* (2006.01)
*B25J 9/16* (2006.01)
(52) U.S. Cl. ......... 701/519; 701/117; 701/120; 700/248
(58) Field of Classification Search .................... 701/22, 701/53; 477/110; 180/65.265; 903/915; B60W 10/04, 10/10
See application file for complete search history.

(56) References Cited

U.S. PATENT DOCUMENTS

| | | | |
|---|---|---|---|
| 5,198,607 A * | 3/1993 | Livingston et al. | 89/1.11 |
| 5,643,135 A * | 7/1997 | Tabata et al. | 477/154 |
| 6,910,657 B2 * | 6/2005 | Schneider | 244/3.11 |
| 7,149,611 B2 * | 12/2006 | Beck et al. | 701/29 |
| 7,480,395 B2 * | 1/2009 | Parunak et al. | 382/103 |
| 2004/0030450 A1 * | 2/2004 | Solomon | 700/245 |
| 2004/0167682 A1 * | 8/2004 | Beck et al. | 701/3 |
| 2005/0008155 A1 * | 1/2005 | Durso et al. | 380/212 |
| 2005/0122914 A1 * | 6/2005 | Durso et al. | 370/270 |
| 2005/0195096 A1 * | 9/2005 | Ward et al. | 340/995.14 |
| 2006/0085106 A1 * | 4/2006 | Gaudiano et al. | 701/23 |
| 2008/0158256 A1 * | 7/2008 | Russell et al. | 345/629 |
| 2009/0219393 A1 * | 9/2009 | Vian et al. | 348/144 |
| 2009/0234499 A1 * | 9/2009 | Nielsen et al. | 700/250 |

OTHER PUBLICATIONS

Schoenfeld, Erik et al., "Door Breaching Robotic Manipulator". In Proceedings of SPIE Defense and Security Conference, Orlando, FL, Mar. 2008.
Yamauchi, Brian. "Daredevil: Ultra Wideband Radar Sensing for Small UGVs", in Proceedings of SPIE: Unmanned Systems Technology IX, Orlando, FL, Apr. 2007.

(Continued)

*Primary Examiner* — Mark Hellner
*Assistant Examiner* — Ari M Diacou
(74) *Attorney, Agent, or Firm* — O'Brien Jones, PLLC

(57) ABSTRACT

A collaborative engagement system comprises: at least two unmanned vehicles comprising an unmanned air vehicle including sensors configured to locate a target and an unmanned ground vehicle including sensors configured to locate and track a target; and a controller facilitating control of, and communication and exchange of data to and among the unmanned vehicles, the controller facilitating data exchange via a common protocol. The collaborative engagement system controls the unmanned vehicles to maintain line-of-sight between a predetermined target and at least one of the unmanned vehicles.

14 Claims, 19 Drawing Sheets

OTHER PUBLICATIONS

Rudakevych, Pavlo et al., "Integration of the Fido Explosives Detector onto the PackBot EOD UGV", In Proceedings of SPIE vol. 6561, Mar. 2007.

Rudakevych, Pavlo et al., "A man portable hybrid UAV/UGV system", In Proceedings of SPIE vol. 6561, Mar. 2007.

Jones, Chris et al., "Sentinel: An Operator Interface for the Control of Multiple Semi-Autonomous UGVs", In Proceedings of the Association for Unmanned Vehicles Systems International. Orlando, FL, Aug. 2006.

Yamauchi, Brian. "Autonomous Urban Reconnaissance Using Man-Portable UGVs", In Proceedings of SPIE: Unmanned Ground Vehicle Technology VIII, Orlando, FL, Apr. 2006.

Yamauchi, Brian. "Wayfarer: an Autonomous Navigation Payload for the PackBot", In Proceedings of AUVSI Unmanned Vehicles North America 2005, Baltimore, MD, Jun. 2005.

Barnes, Mitch et al., "ThrowBot: Design Considerations for a Man-Portable Throwable Robot", In Proceedings of SPIE vol. 5804, Mar. 2005.

Rudakevych, Pavlo et al., "PackBot EOD Firing System", In Proceedings of SPIE vol. 5804, Mar. 2005.

Yamauchi, Brian. "The Wayfarer Modular Navigation Payload for Intelligent Robot Infrastructure", In Proceedings of SPIE vol. 5804: Unmanned Ground Technology VII, Orlando, FL, Mar. 2005.

Yamauchi, Brian et al., "Griffon: a man-portable hybrid UGV/UAV", In Industrial Robot: An International Journal, vol. 31 No. 5, 2004.

Yamauchi, Brian. "PackBot: A Versatile Platform for Military Robotics", In Proceedings of SPIE vol. 5422: Unmanned Ground Vehicle Technology VI, Orlando, FL, Apr. 2004.

Sword, Lee et al., "Mobility Enhancements for Ballistically Deployed Sensors", In Proceedings of SPIE vol. 4393, Apr. 2001.

Rudakevych, Pavlo. "Wave Control: A Method of Distributed Control for Repeated Unit Tentacles", In Proceedings of SPIE vol. 3839, Aug. 1999.

Rudakevych, Pavlo et al., "Micro Unattended Mobility System (MUMS)", In Proceedings of SPIE vol. 3713, Jul. 1998.

Bryant, M. et al., Layered Sensing, Its Definition, Attributes, and Guiding Principles for AFRL Strategic Technology Development, May 1, 2008, Sensors Directorate, Air Force Research Laboratory, Wright Patterson Air Force Base, Ohio.

AirRobot® brochure [website page online]. Airrobot US, Inc. [retrieved on Mar. 15, 2009], Retrieved from the Internet: <URL: http://airrobot-us.com/images/Airrobot_info.pdf.

Autopilots—Piccolo II [website page online], Cloud Cap Technology [retrieved on Mar. 15, 2009]. Retrieved from the Internet <URL: http://www.cloudcaptech.com/Sales%20and%20Marketing%20Documents/Piccolo%20II%20Data%20Sheet.pdf.

Dragon Eye [website page online], Aerovironment, webpage copyrighted 2009 [retrieved on Mar. 15, 2009]. Retrieved from the Internet: <URL: http://www.avinc.com/downloads/Dragon_Eye_AV_datasheet.pdf.

Photon [website page online], FLIR Systems Inc., webpage copyrighted 2009, retrieved on Mar. 15, 2009]. Retrieved from the Internet <URL: http://www.corebyindigo.com/files/Documents/Photon_web.pdf.

Zhang, H. et al., Visibility Culling using Hierarchical Occlusion Maps. undated, University of North Carolina, Department of Computer Science, Chapel Hill, NC.

Raven RQ-11B [website page online]. Aerovironment, webpage copyrighted 2009 [retrieved on Mar. 15, 2009]. Retrieved from the internet: <URL: http://www.avinc.com/downloads/AV_RAVEN-DOM_V10109.pdf.

Payloads—TASE Gimbal[website page online], Cloud Cap Technology [retrieved on Mar. 15, 2009], Retrieved from the Internet <URL: http://www.cloudcaptech.com/Sales%20and%20Marketing%20Documents/TASE%20Gimbal%20Data%20Sheet.pdf.

Murray, Sean et al., "Continued Research in EVA, Navigation. Networking and Com unication Systems", SAE Proceedings, International Conference on Environmental Systems, Jun. 2008.

Yamauchi, Brian. "All-Weather Perception or Small Autonomous UGVs", In Proceedings of SPIE Defense and Security Conference, Orlando, FL, Mar. 2008.

Lenser, Scott et al., "Practical problems in sliding scale autonomy: A case study". In Proceedings of SPIE Defense and Security Conference, Orlando, FL, Mar. 2008.

Cheung, Carol et al., "UAV-UGV Collaboration with a PackBot UGV and Raven SUAV for Pursuit and 4 Tracking of a Dynamic Target", In Proceedings of SPIE Defense and Security Conference, Orlando, FL, Mar. 2008.

Parrington, Lawrence et al., "Door Breaching Robotic Manipulator", In Proceedings of SPIE Defense and Security Conference, Orlando, FL, Mar. 2008.

Yamauchi, Brian, "Daredevil: Ultra Wideband Radar Sensing for Small UGVs", In Proceedings of SPIE: Unmanned Systems Technology IX, Orlando, FL, Apr. 2007.

Rudakech, Pavlo et al. "Integration of the Fido Explosives Detector onto the PackBot EOD UGV", In Proceedings of SPIE vol. 6561, Mar. 2007.

Yamauchi, Brian, "Autonomous Urban Reconnaissance Using Man-Portable UGVs", In Proceedings of SPIE: Unmanned Ground Vehicle Technology VIII, Orlando, FL, Apr. 2006.

Yamauchi, Bran "Wayfarer: An Auonomous Navigaton Payload or the PackBot", In Proceedings of AUVSI Unmanned Vehicles North America 2005. Baltimore, MD, Jun. 2005.

Barnes, Mitch et al., "ThrowBat Design Considerations for a Man-Portable Throwable Robot", In Proceedings of SPIE vol. 5804, Mar. 2005.

Rudakevych, Paylo et al., "PackBot EOD Firing System", In Proceedings of SPIE vol. 5804, Mar. 2005.

Sword, Lee et al., "Mobility Enhancements for Ballistically Deployed Sensors", In Proceedings of SPIE vol, 4393, Apr. 2001.

* cited by examiner

COLLABORATIVE ENGAGEMENT FOR TARGET IDENTIFICATION AND TRACKING

This application claims priority to U.S. Provisional Patent Application No. 61/036,988, filed Mar. 16, 2008, the entire disclosure of which is incorporated herein be reference in its entirety.

INTRODUCTION

The present teaching relate to collaborative engagement of unmanned vehicles to identify, detect, and track a target. The present teachings relate, more particularly, to collaboratively utilizing unmanned air and ground vehicles to identify, detect, and track a target in a variety of urban and non-urban environments.

BACKGROUND

There exists a need to search for, detect, track, and identify human and non-human targets, particularly in urban settings where targets can use their setting, e.g., buildings, narrow alleyways, and/or blending with civilians, to escape or decrease chances of being discovered. In an urban environment, it may not be enough to command an unmanned air vehicle (UAV) to fly over a target and assume that the target will be seen. It may be necessary for the UAV, in an urban environment, to fly at low altitudes and parallel to an alleyway rather than perpendicular to it; or to make an orbit that avoids a tall building. A large risk during urban surveillance is losing a target due to occlusion by buildings. Even with this increased intelligence, the UAV may not be unable to adequately search for, detect, track, and identify a target.

SUMMARY

The present teachings provide a collaborative engagement system comprising: at least two unmanned vehicles comprising an unmanned air vehicle including sensors configured to locate a target and an unmanned ground vehicle including sensors configured to locate and track a target; and a controller facilitating control of, and communication and exchange of data to and among the unmanned vehicles, the controller facilitating data exchange via a common protocol. The collaborative engagement system controls the unmanned vehicles to maintain line-of-sight between a predetermined target and at least one of the unmanned vehicles.

The present teachings also provide a portable tasking interface for facilitating collaboration among at least two unmanned vehicles, the at least two unmanned vehicles comprising an unmanned air vehicle including sensors configured to locate a target and an unmanned ground vehicle including sensors configured to locate and track a target. The portable tasking interface facilitates control of, and communication and exchange of data to and among, the unmanned vehicles via a common protocol. The portable tasking interface is configured to control the unmanned vehicles to assist the operator in searching for a target and to maintain a line-of-sight between an operator-selected target and at least one of the unmanned vehicles.

The present teachings further provide a method for collaborative target detection and tracking by unmanned vehicles with operator supervision. The method comprises receiving target-relevant data from unmanned vehicles, utilizing the target-relevant data to manually detect and select a target, and tracking the selected target via autonomous or semi-autonomous behaviors on each unmanned vehicle such that at least one unmanned vehicle maintains line-of-sight with the target.

Additional objects and advantages of the present teachings will be set forth in part in the description which follows, and in part will be obvious from the description, or may be learned by practice of the present teachings. Such objects and advantages may be realized and attained by means of the elements and combinations particularly pointed out in the appended claims.

It is to be understood that both the foregoing general description and the following detailed description are exemplary and explanatory only and are not restrictive of the present teachings or claims.

The accompanying drawings, which are incorporated in and constitute a part of this specification, illustrate exemplary embodiments and, together with the description, serve to explain certain principles of the present teachings.

DESCRIPTION OF THE EMBODIMENTS

Reference will now be made in detail to exemplary embodiments of the present teachings, examples of which are illustrated in the accompanying drawings. Wherever possible, the same reference numbers will be used throughout the drawings to refer to the same or like parts.

Figure 17:
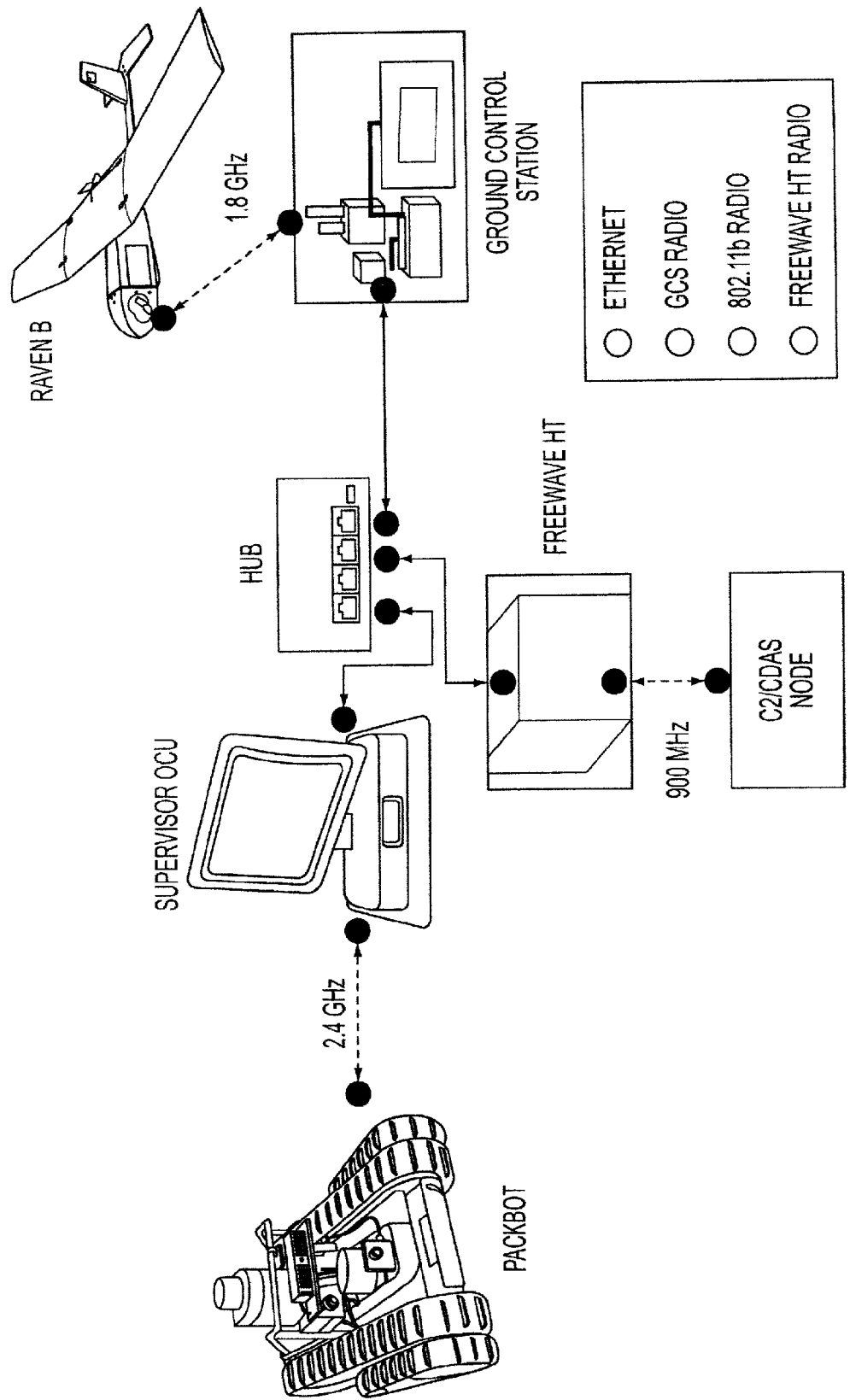
FIG. 17 illustrates an exemplary embodiment of an overall system for collaborative unmanned vehicle target detection and tracking.

In accordance with the present teachings, more than one unmanned vehicle (including one or more UAVs and/or UGVs) is utilized, collaboratively, to search for, detect, track, and identify a target. The unmanned vehicles collaborate to best ensure that at least one unmanned covers the target while the sights of the other vehicle(s) are blocked by, for example, and urban obstruction such as a building. The present teachings contemplate giving unmanned vehicles the intelligence to decide which positions will maximize potential sight lines, to predict (in certain embodiments of the present teachings with operator assistance and guidance) where a target will go, and to allow teams of vehicles to collaborate in achieving full coverage of a target. An exemplary embodiment of an overall system for collaborative unmanned vehicle target detection and tracking is illustrated in FIG. 17. As shown, a Supervisor operator control unit (OCU) communicates with and controls at least one UGV and at least one UAV via, for example radio frequency (RF) and/or Ethernet. In the illustrated embodiment, a ground control station for the UAV is used in addition to the Supervisor OCU for UAV communication and control. This exemplary hardware architecture integrates at least one UGV and at least one UAV with a single common controller, the Supervisor OCU. Communication to and among the unmanned vehicles enables the desired collaboration. As an example, for collaborative target tracking, the required information to be shared includes the target's state estimate and its covariance matrix, as well as the uncertainty of the target's state. As this data is shared through the network, the target data gets fused as described below regarding DDF architecture. Collaboration occurs when the fused target estimate is updated among the unmanned vehicles. The Supervisor OCU can provide the fused track estimate to a system operator.

In embodiments employing a Raven as the UAV, the Raven communication and control hardware, commonly referred to as its Ground Control Station (GCS), can comprise a hand controller, a hub unit, an RF unit, and an antenna(e) post. The GCS hub unit can process and convert the message, telemetry, and hand controls to Cursor-on-Target (CoT) messages to be received by the UAV platform. The GCS hub and the illustrated FreeWave radio can interface with the Supervisor OCU via an Ethernet hub for computationally intensive tasks.

The present teachings contemplate developing a system allowing a team of unmanned vehicles to search urban terrain for an elusive human dismount target or non-human target, track the target even if it attempts to avoid detection, and pursue and engage the target on command from an operator.

In certain embodiments as described hereinbelow in more detail, the present teachings are implemented on a PackBot as the UGV and an AeroVironment Raven or AirRobot quadrotor platform as a UAV. However, one skilled in the art will appreciate that a variety of known UGVs and UAVs may be utilized collaboratively in accordance with the present teachings.

Certain embodiments of the present teachings contemplate integrating existing or developing visual tracking algorithms (such as, for example, those being developed by the Air Force Research Laboratory (AFRL)) with existing situational awareness frameworks (such as, for example, the AFRL Layered Sensing model), which can be augmented by human assistance from an operator (using, for example, and operator control unit such as that provided for an iRobot PackBot) in the area of, for example, identifying the most likely targets. In accordance with certain embodiments, identified targets can be provided to the unmanned vehicle teams in terms of global positioning system (GPS) coordinates.

The present teachings further contemplate utilizing, for example, an a priori digital terrain elevation data (DTED) map of the urban terrain, from which target paths can be predicted (in some embodiments with operator assistance), and motion of the unmanned vehicles can be planned to maximize probability of keeping a target in view despite the presence of occluding obstacles. Certain embodiments of the present teachings provide such tracking and predicting a location of a target in the presence of occlusions (such as those that exist in urban environments) using certain predefined algorithms, and integration of those algorithms with semi-autonomous or autonomous behaviors such as navigation and obstacle avoidance behaviors suitable for real-world urban terrain.

In certain embodiments, the present teachings provide a UGV that is equipped with an orientation sensor such as a GPS or INS/GPS system (such as, for example, and Athena Micro Guidestar INS/GPS or a MicroStrain 3DM-GX1 orientation sensor) for navigation based on both GPS and INS, including navigation in occluded spaces such as urban canyons that may intermittently block GPS signals. The UGV can be equipped with a payload such as a Navigator Payload (which can include, for example, a stereo vision system, GPS, LIDAR (e.g., SICK LIDAR) integrated with GPS, an IMU, a gyro, a radio and a dedicated processor (for example running iRobot's proprietary Aware 2.0 software architecture)). The Navigator payload can provide, for example, on-board integrated obstacle avoidance and waypoint following behaviors through complex terrain. The UGV can additionally be equipped with a camera (e.g., a Sony zoom camera) on a pan/tilt (e.g., a TRAClabs Biclops pan/tilt) mount to keep a target in view from the ground.

The present teachings provide a UAV and UGV team that can track and potentially engage a human or non-human target. In certain embodiments, a single operator can control one or more unmanned vehicles to perform the operations necessary to search for, track, monitor, and/or destroy selected targets. This functionality can be implemented in accordance with the present teachings by utilizing a Layered Sensing shared situational awareness system that can determine the location of targets using combined machine perception and human feedback. The Layered Sensing system has been defined (by AFRL) as a providing "military and homeland security decision makers at all levels with timely, actionable, trusted, and relevant information necessary for situational awareness to ensure their decisions achieve the desired military/humanitarian effects. Layered Sensing is characterized by the appropriate sensor or combination of sensors/platforms, infrastructure and exploitation capabilities to generate that situational awareness and directly support delivery of "tailored effects." In accordance with various embodiments, the Layered Sensing system can direct an unmanned vehicle team to investigate a target and determine an optimal path to fly to view the target. It can also return views of the target from the air and the ground for operator (and other personnel) review. In conjunction with an a priori map and based on terrain data such as DTED terrain data, it can predict the target's location or assist an operator in predicting the targets location and, based on such prediction, determine an optimal path to fly to view the target.

In certain embodiments, if one of the unmanned vehicle team members flies to the predicted target location and cannot view the target, one or more of the unmanned vehicles in the team can utilize predictive algorithms in accordance with the present teachings to fly a search pattern to attempt to find the target. If the target is spotted by a team member, that team member—using its own GPS coordinates to determine GPS coordinates of the target—can send the target location to other team members. The UAV has mounted thereon one or more cameras that can, for example, be mounted in gimbals (e.g., a Cloud Cap Technology TASE gimbal) for optimal range of motion. If more than one camera is used, one camera can face forward and one camera can face to the side to keep the target in view. The cameras allow the UAV to keep the target in view. Another team member, such as an unmanned ground vehicle (UGV), can then navigate autonomously (or semi-autonomously with operator assistance) to the target location using, for example, GPS, INS, compass, and odometry for localization and LIDAR for obstacle avoidance. The LIDAR obstacle sensing can be integrated with terrain data from maps of from another source such as a team member. A path planning algorithm such as A* or a Rapidly-exploring Random Tree (RRT) can be utilized to plan a path to the target based on an a priori map. An RRT is a data structure and algorithm, widely used in robot path planning, designed for efficiently searching non-convex, high-dimensional search spaces. Simply put, the tree is constructed in such a way that any sample in the space is added by connecting it to the closest sample already in the tree.

When a team member arrives in a proximity of the target, the team member can use its camera to attain a close-up view of the target. Then, as the target moves, the unmanned vehicle team is controlled to best maintain a view of the target despite occluding obstacle, using a combination of the target prediction algorithms and local navigation behaviors such as obstacle avoidance.

Path Planning to Search for Target

When searching for a target, UAV team members that comprise fixed wing aircraft (such as, for example, an AeroVironment Raven or Dragon Eye (with autopilot as necessary)) cannot remain stationary and must orbit, and therefore should be capable of planning for occlusions and minimizing them. In accordance with certain embodiments of the present teachings occlusion planning and minimization can be accomplished as follows:

First, the system attempts to evaluate or predict where the target is likely to be within a short time horizon (e.g., one to two minutes) by computing a distribution $p_t(x)$ that gives a probability that the target is at x at time t. This can be accomplished, for example, by sampling from past observations of target tracks, a goal-oriented walking or running model for a target, and/or a model selection algorithm that chooses the best among these and other known models. The distribution can be represented and updated efficiently using particle filters, which is an extension of a Kalman-type filter to multi-modal distributions.

Figure 1:
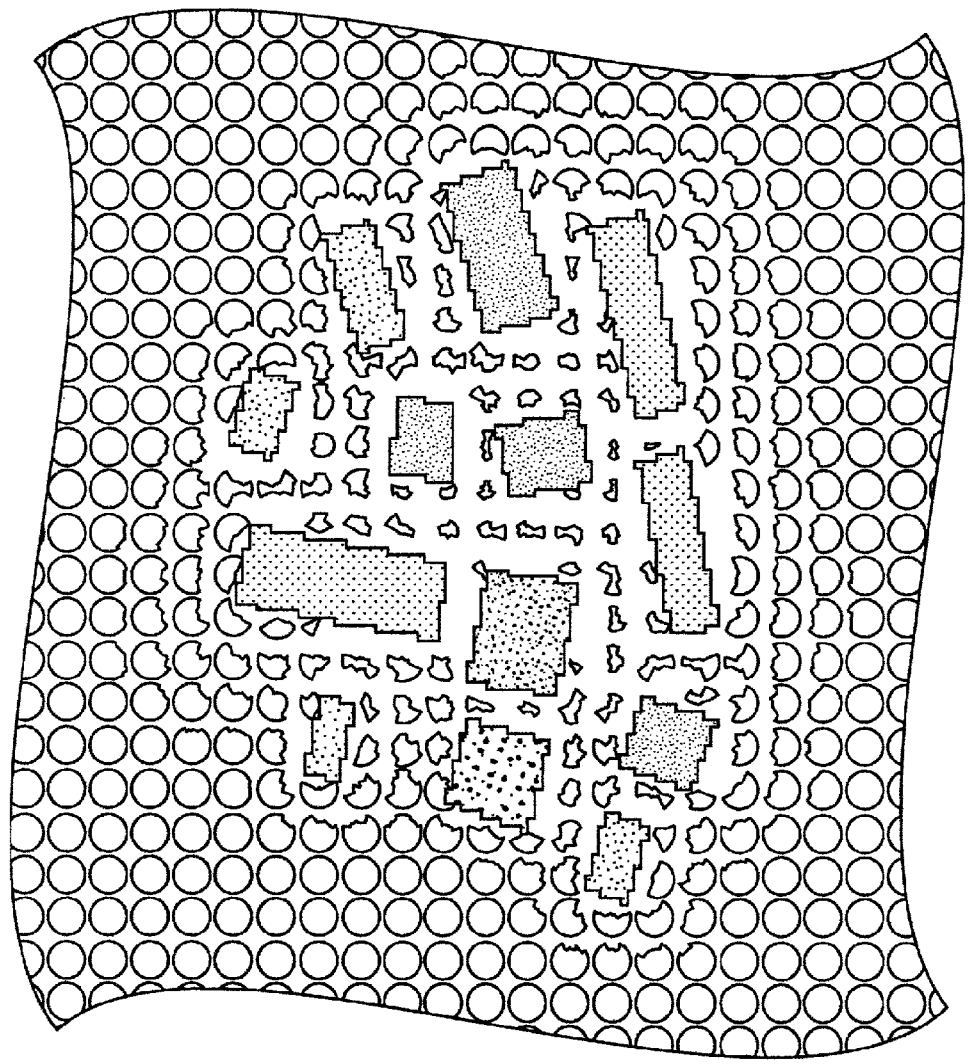
FIG. 1 illustrates an exemplary visibility map.

Once the system has evaluated or predicted where the target is likely to be within the short time horizon, it can then attempt to predict where unmanned vehicle team members can be positioned to best "see" a target. This computation can be based on a pre-computed visibility map and a distribution of where the target is likely to be. Given a distribution of the target position $p_{x,t}(x)$ and a visibility map $p_{y|x}(y|x)$ giving a probability that a target at x is visible from an unmanned vehicle (e.g., a UAV) at position y, the system calculates the probability $p_{y,t}(y)$ that the target is visible from an unmanned vehicle at position y. These calculations or algorithms can be implemented on a graphic processor unit (GPU) such as Quantum3D's COTS GPU for real-time computation. A GPU is a dedicated graphics rendering device that is very efficient at manipulating and displaying computer graphics. Its highly parallel structure makes it more effective than general-purpose CPUs for a range of complex algorithms. The visibility map is computed ahead of time, so that at every position $p_{y|x}(y|x)$ can be represented for constant x as a polygon that is fast to compute. The GPU can be used to accumulate the polygons in a buffer to generate a visibility map, an example of which is illustrated in FIG. 1 and discussed in more detail below. The illustrated polygons are equally spaced on a grid, and each polygon represents the visibility at its center point. A full circle means that the area is unoccluded (in this map by the illustrated buildings). Otherwise, the polygon is effectively a radial plot representing the elevation angles from which the point is visible. Therefore, the smaller the polygon, the less its area is visible from the air.

Figure 2:
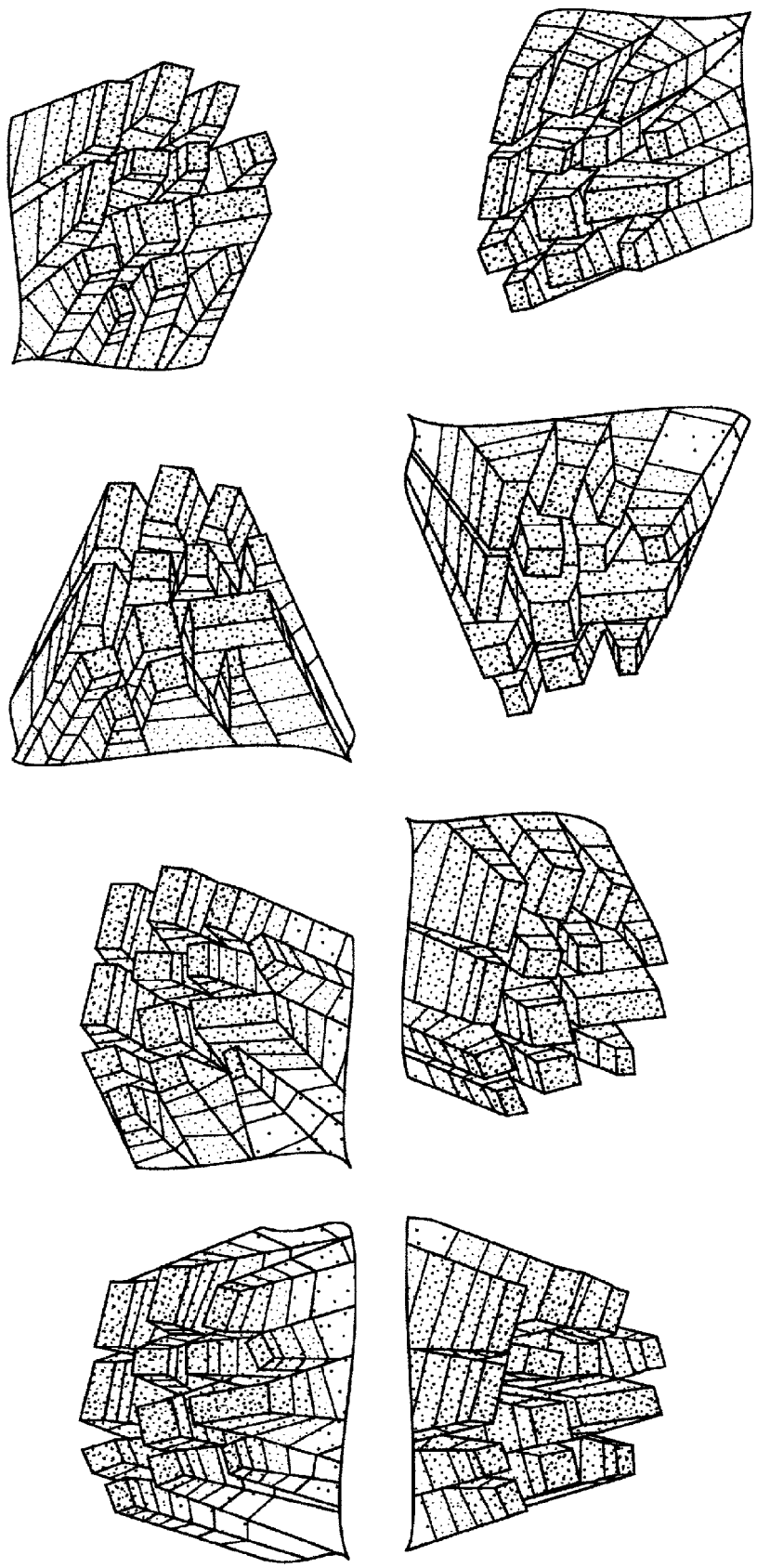
FIG. 2 illustrates exemplary visibility codes from a variety of directions for the location illustrated in the visibility map of FIG. 1.
Figure 3:
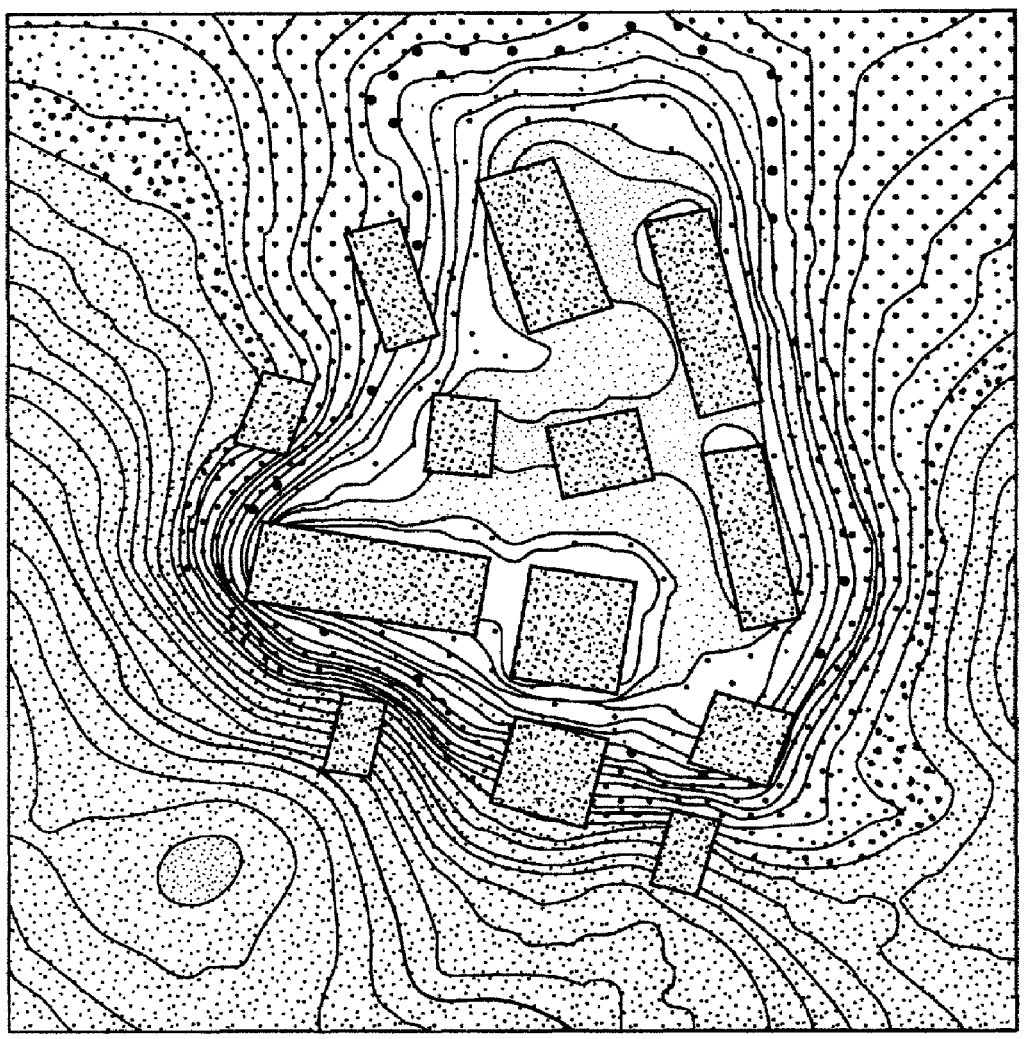
FIG. 3 illustrates an exemplary visibility likelihood map for a uniform distribution of targets, cumulative of the directional visibility illustrated in FIG. 2.

Visibility codes are then generated for the area illustrated in FIG. 1. These visibility codes can be illustrated, for example, in eight different directions for which visibility can be evaluated. The visibility codes are illustrated in FIG. 2 for the eight different directions. Shades of gray determine the level of occlusion in the illustrated direction, darker areas representing more occlusion. Thus, darker areas are less visible from the given direction; i.e., the minimum elevation angle at which the sky is visible is higher the darker the area is. FIG. 3 represents a map that is cumulative of the directional visibility illustrated in FIG. 2. FIG. 3's visibility likelihood map assumes that the target could be anywhere in the map (i.e., assuming a uniform distribution of the position of the dismount on the ground). Lighter areas are positions from which one is less likely to see the target. Notice that the center area is lighter because of the greater number of occlusions caused by the buildings.

Figure 4:
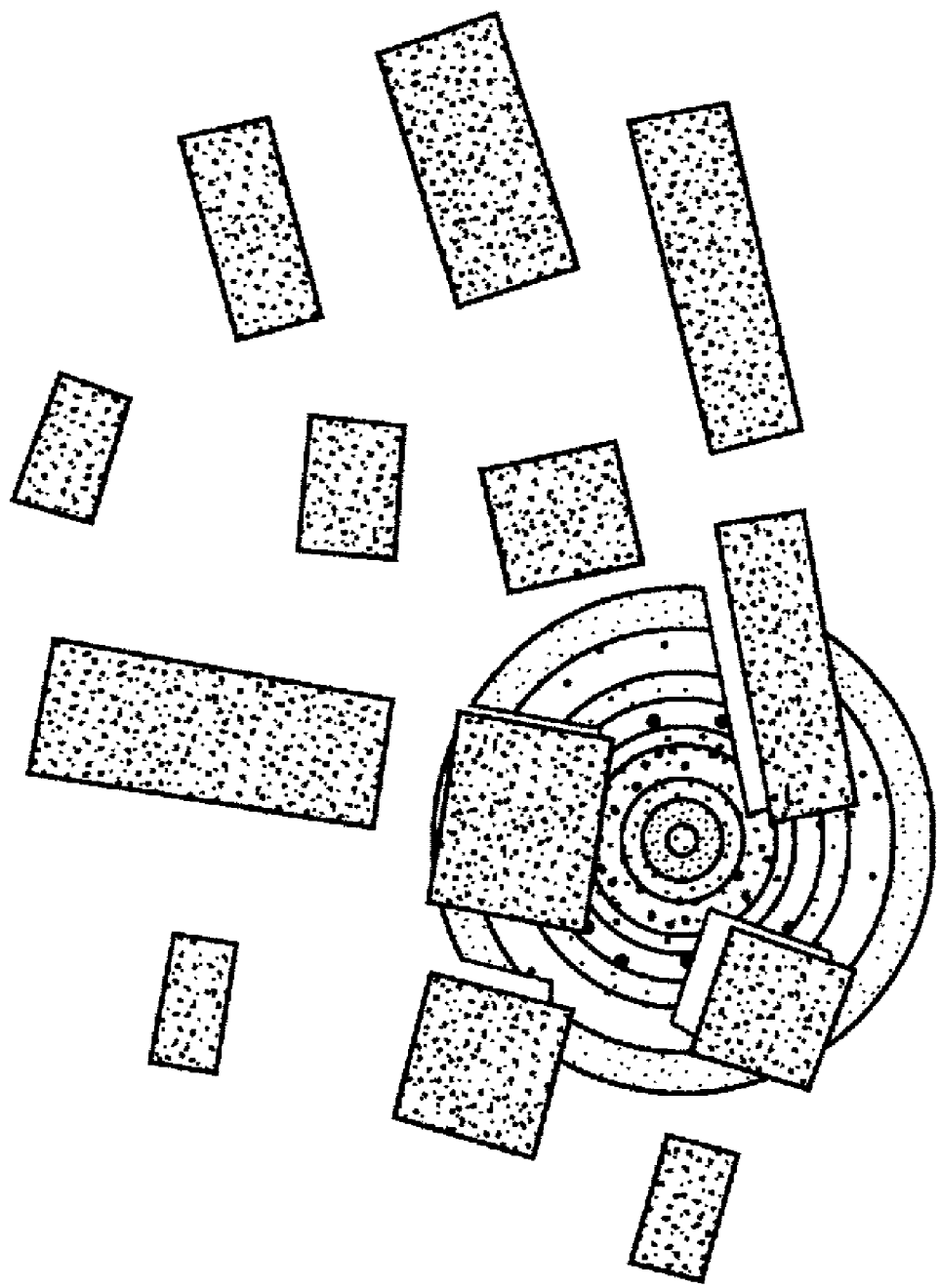
FIG. 4 illustrates an exemplary visibility likelihood map for a non-uniform distribution of targets.
Figure 5:
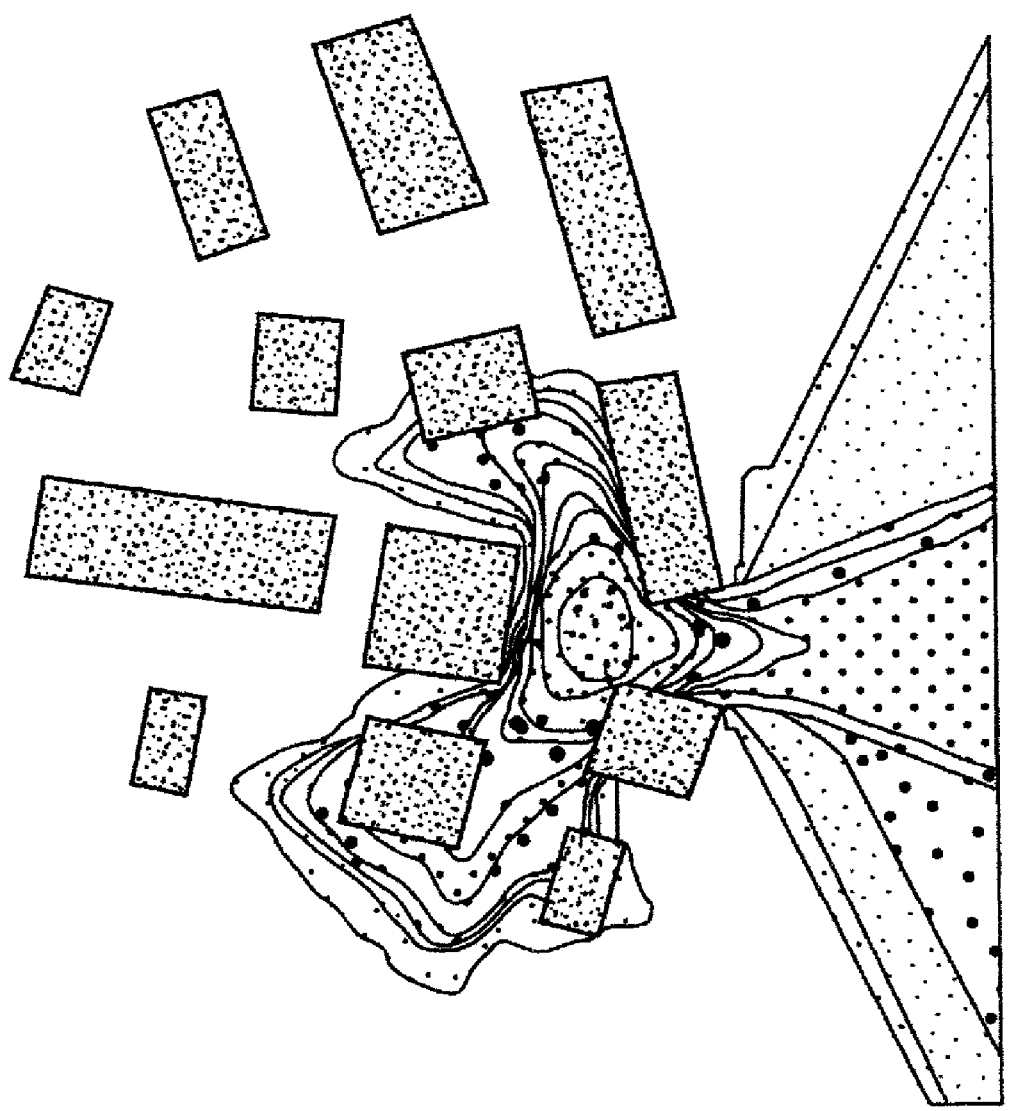
FIG. 5 illustrates an exemplary visibility likelihood map generated when a non-uniform distribution of possible target positions is known.

FIG. 5 illustrates a visibility likelihood map generated when a non-uniform distribution of possible target positions is known, as illustrated in FIG. 4. When a non-uniform distribution of possible target positions can be used, the area where the target is likely to be visible from can be understandable much more concentrated than in the map of FIG. 3.

The system next calculates a path for one or more unmanned vehicle team members that minimizes loss of the target. Paths are generated by the RRT and evaluated by the system and/or one or more operators to determine a path that minimizes a given criteria (e.g., the amount of time a target is lost). In certain embodiments of the present teachings, the system chooses a path y(t) that maximizes $\int p_t[y(t)]dt$, where the integral is performed over the time horizon.

Framework for Collaborative Unmanned Vehicle Planning

Choosing where an unmanned vehicle should go to find a target is a complicated decision that depends on where one believes the target is, and where it might go during the time it takes a team member to get to a viewing position. The present teachings provide the capability to evaluate a number of paths and choose a path or accept instructions from an operator regarding path choice. Once the path is selected, one or more unmanned vehicle team members are directed in accordance with those paths to execute autonomous navigation.

As stated above, the present teachings can combine RRTs to represent possible trajectories of the unmanned vehicles and Monte Carlo methods to represent the uncertainty about where the target is. Possible target trajectories are constructed over a finite time horizon and, during RRT traversal, the system tracks how many times it has seen a particle for each RRT node. This is because it can be disadvantageous to continue following a particle that has already been seen, and so a cost function can discount particles that have been seen more than once. This method can generate one or more paths that sweep out and attempt to consume the probability mass of where the target may be. Monte Carlo methods, with which those skilled in the art are familiar, are a class of computational algorithms that rely on repeated random sampling to compute their results. Monte Carlo methods are often used when simulating physical and mathematical systems, and when it is infeasible or impossible to compute an exact result. The present teachings contemplate, for example, evaluating more than 64,000 trajectories, and at each of the 128,000 RRT nodes, evaluating the visibility of 5,000 particles, all at a rate of 1 Hz.

Visibility Map Generation Using GPUs

For map generation (in a timely manner), various embodiments of the present teachings perform visibility computations using DTED data (e.g., Level 4 data or higher ($\frac{1}{9}^{th}$ or $\frac{1}{27}^{th}$ arc second spacing)) to create a map representing the visibility at each location. Performing these computations on a GPU allows rapid map generation and real-time calculation of visibility by rendering polygons representing visibility (see FIG. 1) and obtaining a map (e.g., a color-coded map) therefrom whose values (colors) tell the system and/or an operator how likely an unmanned vehicle team member, and particularly a UAV, is to be able to view a target from a given point.

In a color-coded visibility map that can be generated in accordance with the present teachings, the different colors utilized in the map can represent the direction from which the target is visible. For example, a red-colored area on the map can represent an area from which a target is visible to the east. Light blue, on the other hand, can indicate an area from which the target is visible to the west. Brighter color can, for example, indicate an area where an unmanned vehicle is more likely to see a target (from the color-indicated direction). Further, a mixture of colors can be used to indicate more than one direction from which the target may be visible. Such a map can be calculated for either a concentrated (there is some idea where the target is) or uniform (target could be anywhere) distribution of target position. Thus, if a potential target location is unknown, the system (e.g., the GPU) can nevertheless compute a best location by accumulating polygons over all possible positions. If the target location is known, the system (e.g., the GPU) can compute visibility maps several times per second.

Figure 6:
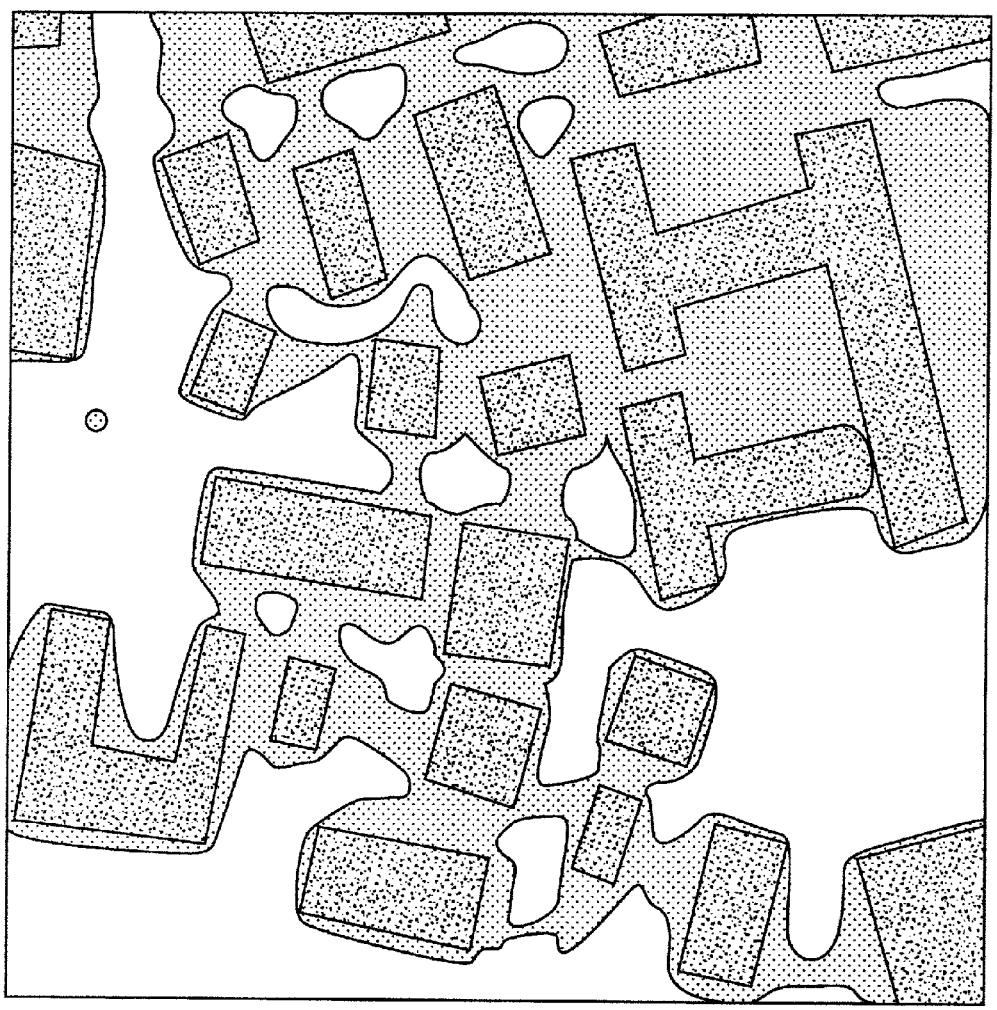
FIG. 6 illustrates an exemplary grey-scale visibility map showing a likelihood that a target (dot at left side) can be viewed from any direction.

As an alternative to, or in addition to such color-coded maps, a grey-scale visibility map can be generated and utilized, such as that illustrated in FIG. 6, which shows a likelihood that a target (dot at left side) can be viewed from any direction. A marginal probability of viewing the target from any direction from a given point is shown. Lighter indicates an increased chance of viewing the target. Thus, white areas correspond to viewpoints from which the target is likely to be viewed, and dark areas correspond to viewpoints from which the target is unlikely to be viewed. Such a map can be used for computing an A* or RRT path.

Figure 7:
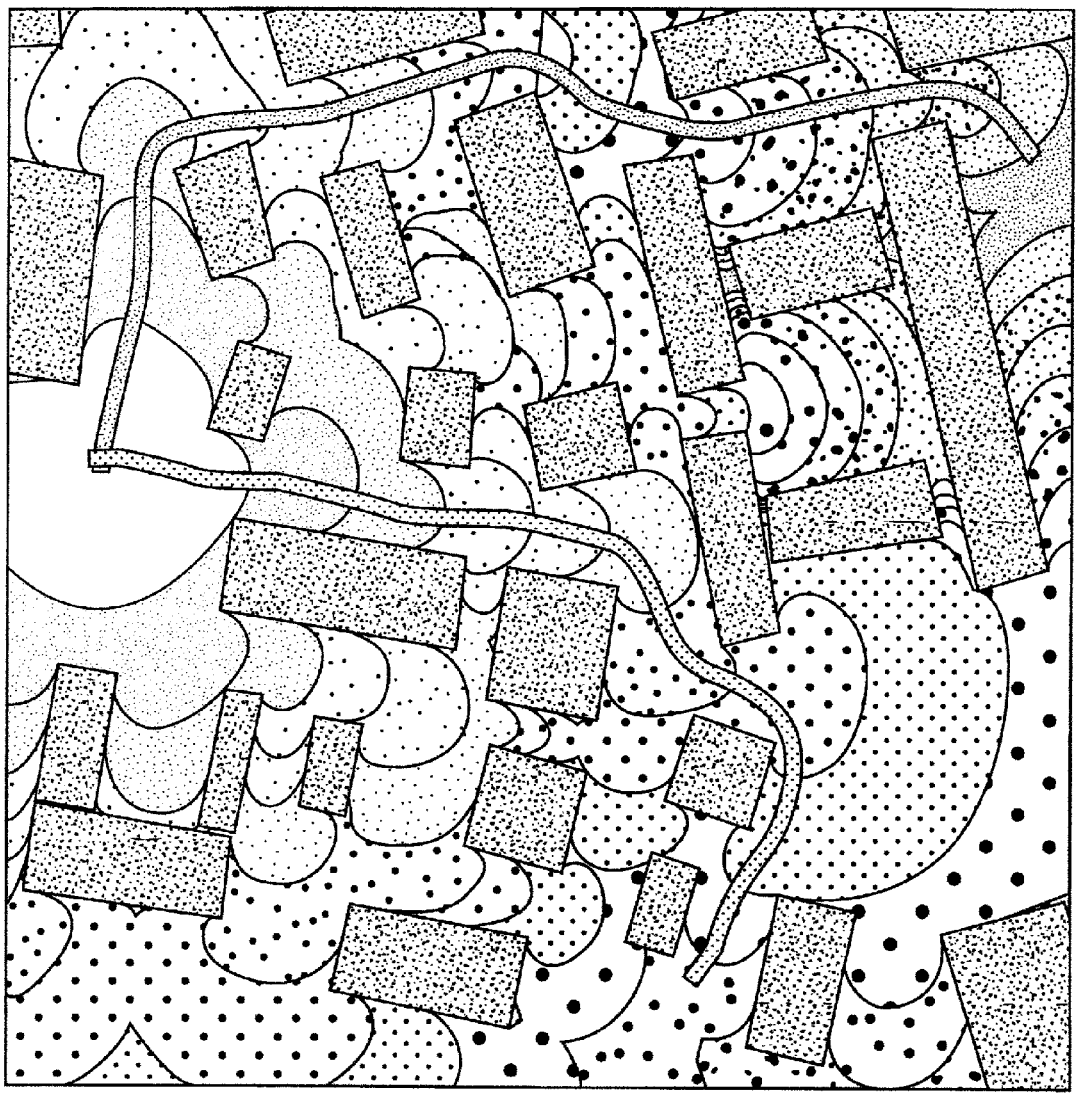
FIG. 7 illustrates an exemplary navigation cost map based on the values of FIG. 6.

FIG. 7 illustrates a navigation cost map based on the values of FIG. 6, with equal cost contours. Thus, the visibility map is used as a cost map for computing an unmanned vehicle surveillance path, such as an A* path. The grayscale background of FIG. 7 shows the cost to come from any place on the map to the peak of the cost function. Contours of equal cost emanate from the starting position (the red dot in FIG. 6). White (lighter) areas correspond to a lower total travel cost (or higher likelihood of detection) and darker areas correspond to a higher total travel cost (lower likelihood of detection). The two paths traverse to the peak of the cost function, visiting the most likely areas for finding the target. Regarding the lower path, the planner could decide that, because of the large high probability area in the lower right corner where the target is likely to be seen, the unmanned vehicle should follow this path through the high probability area instead of taking the upper path, although the upper path may be shorter.

Thermal Vision Target Tracking

Certain embodiments of the present teachings additionally utilize thermal vision target tracking. Thermal vision target tracking can be accomplished, for example, by equipping one or more of the unmanned vehicle team members (e.g., a UGV) with a thermal infrared camera. The thermal infrared camera can comprise, for example, an FLIR Photon thermal imager. Thermal imaging is particularly useful for tracking human targets when the ambient temperature is less about 90 degrees. Presently, an effective imaging range for a thermal imager can be extended to about 30 meters.

When a target has been located via thermal imaging. Tracking software can apply thresholding to the thermal image to eliminate isolated pixels to filter noise. The centroid of the remaining points can then be used to determine a bearing to the target within the image plane. A following behavior can turn the UGV to face the target based on a horizontal coordinate of the centroid, and can maintain a desired distance from the target based on a vertical coordinate of the centroid (i.e., if the target is higher (father) in the image than desired, the UGV moves forward, and if the target is lower (nearer) in the image than desired, the UGV halts or moves backward. In this way, the UGV follows the target while maintaining a desired separation.

Certain embodiments of the present teachings can additionally or alternatively utilize thermal imaging with a UAV.

The Control Architecture

In accordance with certain embodiments of the present teachings, the control architecture comprised the following three primary parts: (1) a fully integrated architecture fusing the U.S. Army's Armament Research, Development and Engineering Center multi-platform controller (ARDEC MPC) architecture, a Mission Planner with collaborative engagement capabilities, and local Decentralized Data Fusion nodes on the unmanned vehicles; (2) a populated Mission Planner with target engagement-specific Mission Task Components, associated agents and defined interface(s) to integrate with the MPC architecture; and (3) a functional architecture decomposition of specific Mission Task Components to clarify how high level tasks are executed at the low level by the respective unmanned platforms. These parts are described in detail hereinbelow.

The present teachings contemplate many or all of the following functions being performed by the operator and/or members of the unmanned vehicle team. Hereinafter, the operator and members of the unmanned vehicle team are referred to as mission agents.

| Engagement Functions | Agents to Perform Function | OCU/UAV/UGV Behaviors |
|---|---|---|
| Maneuver to get target in view | UGV, UAV | Read in terrain/road network map<br>Path plan from pt A to pt B<br>Register self to map<br>Maneuver map<br>Update location on path plan<br>Avoid obstacles to conduct path plan |
| Detect Threat evaluation | Operator, UGV Operator | Identify target of interest in image<br>Operator determines target thread in image<br>OCU calculates target geo-position from sensor platform location, pointing and geo-referenced map |

-continued

| Engagement Functions | Agents to Perform Function | OCU/UAV/UGV Behaviors |
|---|---|---|
| Acquisition | Operator, UGV, UAV | Track features of background image and difference with target of interest |
| Track | UGV, UAV | Reverse kinematics background features with vehicle motion model<br>Generate estimated target position measurement<br>Generate target track and uncertainty |
| Correlate track | UGV, UAV | Coalesce platform feature data<br>Register localized platform<br>Match local platform tracks |
| Fuse track | UGV, UAV | Update global track with respective tracks and uncertainty |

In accordance with certain embodiments of the present teachings, simultaneous control of at least one UAV and at least one UGV is achieved from a single operator control unit (OCU), which can be achieved using waypoint navigation for both the UAV and UGV. Because the UAV and UGV may handle waypoints in different ways, the system can provide integration of waypoint control. For example, waypoint paths generated by the Supervisor OCU can be translated to appropriate UAV waypoint paths. Software tools can be employed for task allocation to support coordinated search, pursuit, and tracking of a target with unmanned vehicles.

Figure 8:
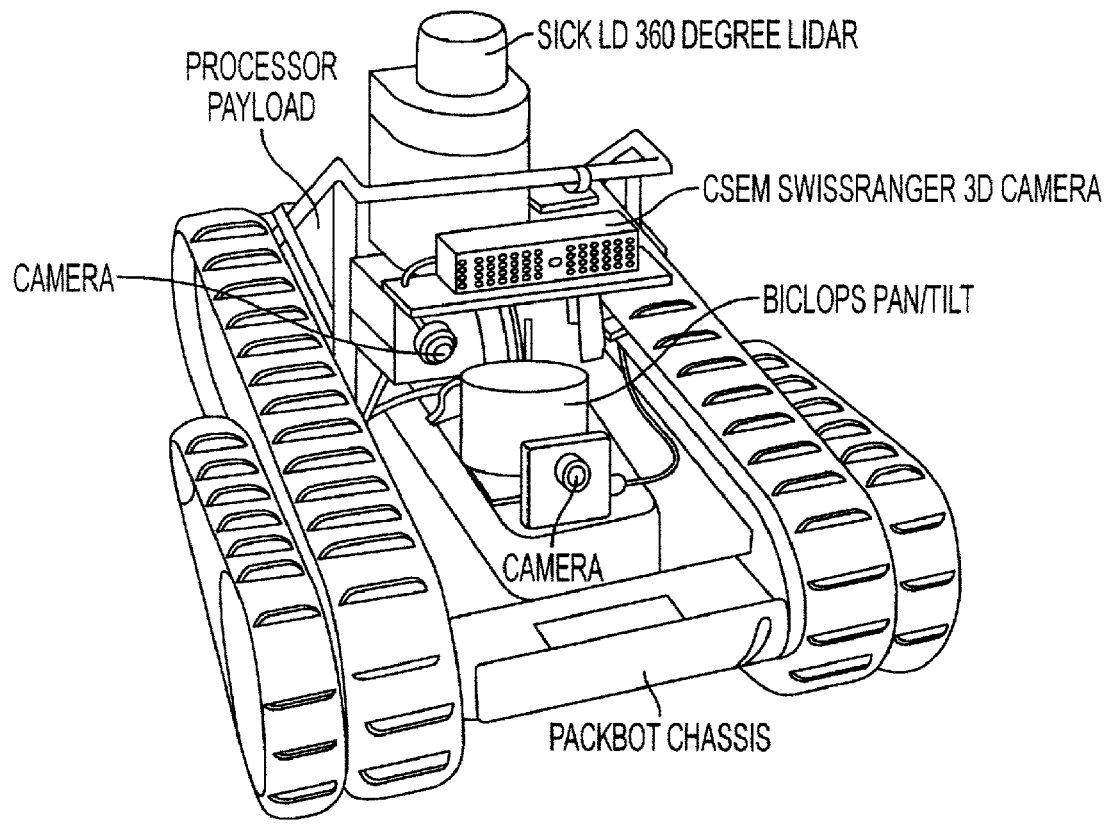
FIG. 8 illustrates an exemplary UGV for use in a system in accordance with the present teachings.

The overall system in accordance with an exemplary embodiment of the present teachings comprises an iRobot PackBot UGV with, for example, a Navigator payload and sensor suite. The PackBot and its Navigator Payload sensor suite can operate using the Aware 2.0 robot control architecture. The PackBot, as illustrated in FIG. 8, is equipped with two main treads used for locomotion, and two articulated flippers having treads that are used to climb over obstacles. A PackBot can typically travel at sustained speeds of up to 4.5 mph. A PackBot's electronics are typically enclosed in a compact, hardened enclosure, and can comprise a 700 MHz mobile Pentium III with 256 MB SDRAM, a 300 MB compact flash memory storage device, and a 2.4 GHz 802.11b radio Ethernet.

Figure 9A:
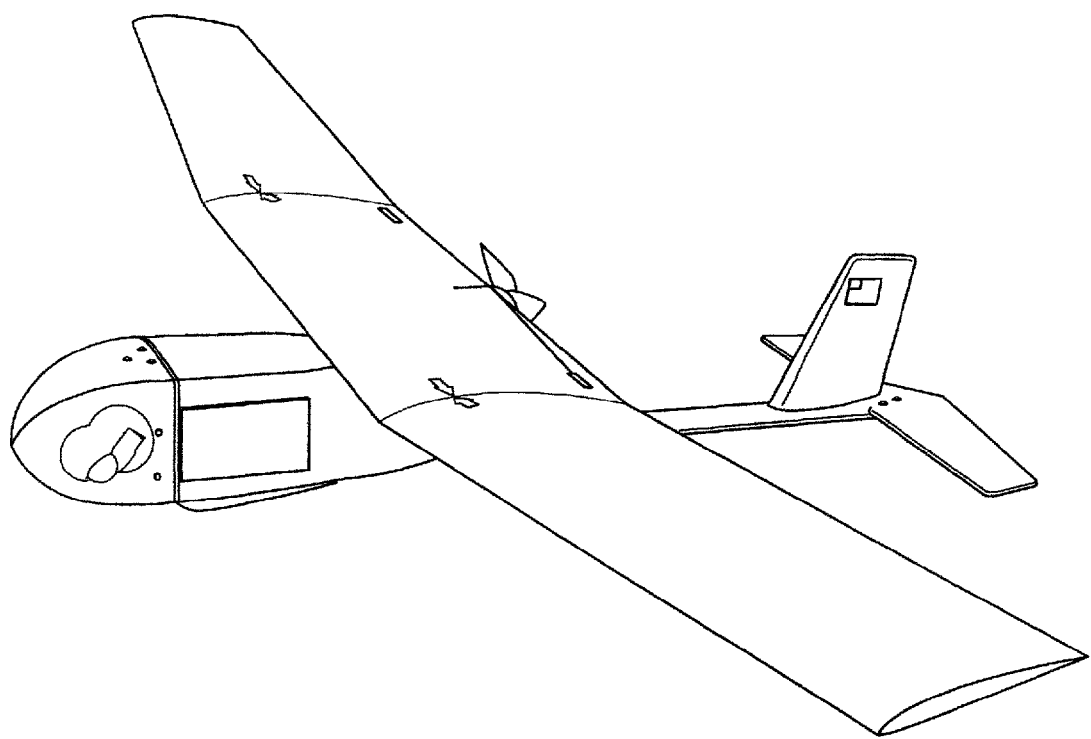
FIG. 9 illustrates an exemplary UAV for use in a system in accordance with the present teachings.
Figure 9B:
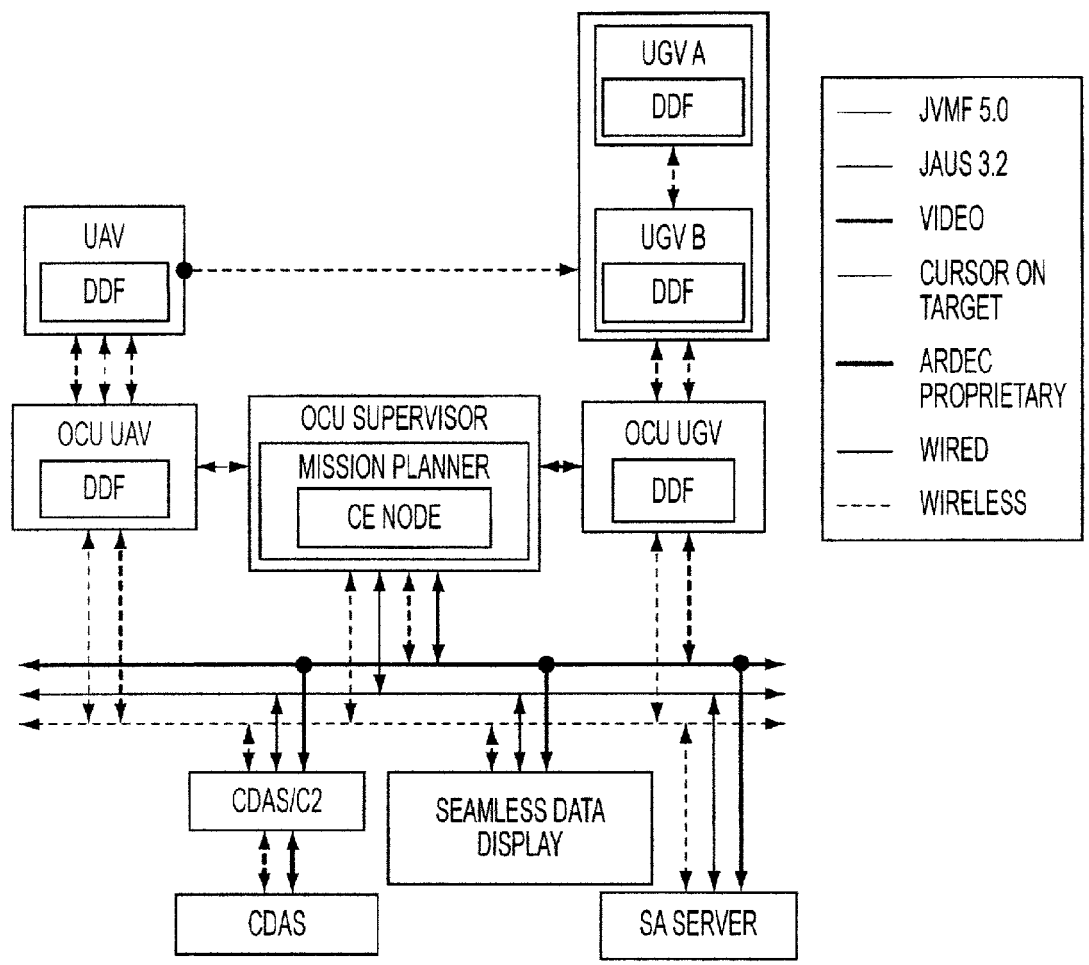

The system can also comprise an AeroVironment Raven UAV that is back-packable and hand-launchable. A Raven is illustrated in FIG. 9. The Raven typically has a 90-minute flight duration and features EO/IR payloads and GPS. The Raven can be operated manually or programmed for autonomous operation using, for example, a laptop mission planner for processing and the Raven's advanced avionics and precise GPS navigation. The Raven has a wingspan of 4.5 feet and can weigh just over 4 lbs. It can be assembled in less than 30 seconds and supports aerial surveillance up to 10 km in line-of-sight range. The raven can travel at speeds of up to 50 knots. It can be equipped with forward-looking and side-looking camera ports.

FIG. 9 illustrates an architecture supporting an integrated system in accordance with various embodiments of the present teachings. The OCU Supervisor includes a Mission Planner with a collaborative engagement (CE) node. Combat Decision Aid Software (CDAS) and CDAS/C2 nodes (bottom left) provide mission-level commands to the Mission Planner CE node and can receive mission status, target information and event data from the Mission Planner. Mission-relevant image data, target data and unmanned vehicle data can be provided to the Situational Awareness (SA) server. The Mission Planner CE node is the central node that manages the overall unmanned system and decomposes the CDAS/C2 high level mission commands to appropriate unmanned system agents. The Mission Planner CE node functions are described in more detail hereinbelow. CDAS is a high-level mission planning, decision support tool providing simultaneous situational awareness, data sharing, and mission analysis for multiple combat units. CDAS provides libraries, functions, and capabilities that minimize redundant efforts and conflicting capabilities or efforts, and can assist in providing relevant, timely, and critical information to the operator.

In certain embodiments, a CDAS CoT component can be utilized to translate Aware 2.0 interface calls from the Supervisor OCU to Cot messages that are sent to CDAS, and to receive CoT messages from TCP and/or UDP and translate them to Aware 2.0 events/interface calls.

The Mission Planner conducts discrete management of tasks and assigns those tasks to the unmanned vehicles while the Decentralized Data Fusion (DDF) nodes manage, in a distributed fashion, low-level continuous execution of the tasks and coordinate shared data and discrete maneuvers. DDF function is described in detail hereinbelow. The illustrated architecture allows for the Mission Planner to handle contingency operations as they arise and respond to them by updating tasks to the team agents while the DDF nodes support tight collaboration and coordinated maneuvers to pursue and geo-locate the target.

The Mission Planner CE node can be separate from the OCUs from a functional and interface perspective. The software modules can be designed to be plug and play. Therefore, the Mission Planner module can have interfaces allowing it to be located in the OCU Supervisor or separated onto another piece of hardware. In fact, the Mission Planner node and the OCUs for both UAV(s) and UGV(s) are envisioned to be located in the same hardware unit, referred to herein as the "OCU Supervisor." The architecture design can allow a single operator to monitor and control the mission through the OCU Supervisor. The collaborative software system can be quickly responsive to mission changes and replanning, while also reducing the complexity in the number of components and their respective interfaces. This is facilitated by the UAV and UGV systems supporting waypoint navigation.

In accordance with certain embodiments, the OCU Supervisor can display both video and telemetry data of each unmanned vehicle to the operator. It can also allow the operator to manually control each unmanned vehicle. In certain embodiments, while the OCU Supervisor includes the hardware typically used to manually operate the UGV, a separate hand controller can be utilized for manual control of the UAV. The exemplary architecture illustrated in FIG. 9 includes two UGVs, one UAV, one UGV OCU and one UAV OCU. The number of unmanned vehicles and OCUs may vary in accordance with the present teachings.

Tactical UAVs are typically designed for optimal endurance and hence minimized for weight. As a result, computing on the UAV platform is typically minimal. Most of the required collaborative DDF processing and coordinated navigation software will therefore be located on the UAV OCU, rather than on the UAV platform itself. On the other hand, tactical UGVs are typically not as constrained for weight and endurance and have significantly higher on-board processing capacity. In such a case, most all of the required collaborative DDF processing can occur on the UGV platform.

The exemplary architecture illustrated in FIG. 9 supports not only individual and coordinated control of the UAV and UGVs, but it also supports the UAV to act as a data relay. Joint Architecture for Unmanned System (JAUS) messages sent to the UAV can be passed through to the UGV for processing.

Hence, a UAV data relay can significantly extend the control range of the UGV by at least an order of magnitude.

Mission Planner—Collaborative Engagement Architecture

Figure 10:
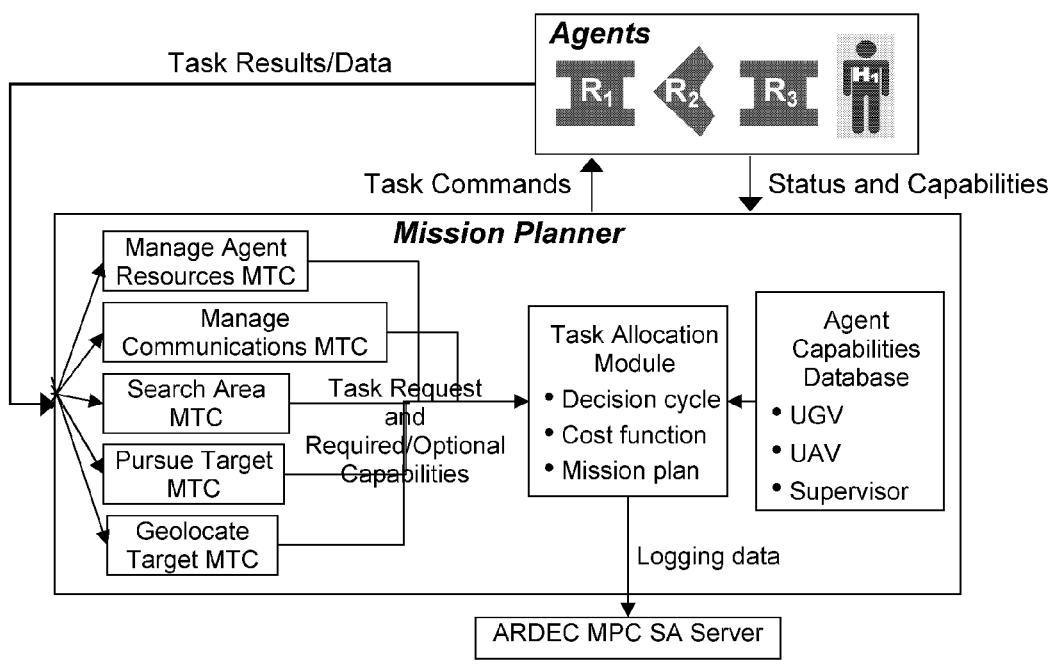
FIG. 10 illustrates exemplary functional blocks that can be utilized to plan mission execution.

In certain embodiments, the Mission Planner specifies the high-level mission to be executed, and the architecture in FIG. 10 illustrates the functional blocks that can be utilized to plan mission execution. The definition of the illustrated architecture is based on a defined mission planner framework that can be a modified version of the Overseer SBIR project, which can provide localization, path planning, waypoint navigation, an object avoidance for at least unmanned ground vehicles. This architecture can manage resources of the mission to optimize execution from a centralized planner at the system level. Mission Task Components (MTC) are tasks over which the Mission Planner has purview and are assigned to agents through a decision step in the Task Allocation Module.

The illustrated mission thread contains four agents: an operator; a UAV; and two UGVs. The capabilities and status of the operator and unmanned vehicles are recorded and continually updated in the Agent Capabilities Database. In accordance with various embodiments, if an unmanned vehicle has low battery power or has been damaged, the Agent Capabilities Database stored such information and can provide appropriate weighting to the agent's ability to perform a given task which will impact the Task Allocation decision.

MTC tasks are intended to manage the highest level of tasks for executing the collaborative engagement mission. These high-level tasks can be executed by individual agents or a combination of agents. In all cases, specific software modules will support each high-level MTC. As illustrated in FIG. 10, the primary MTCs to conduct a collaborative target engagement can be:

Manage Agent Resources
  This task allows the Mission Planner to identify available agents, monitor the status of current agents, and acknowledge disabled agents in the mission. If agents are disabled or additional agents become available, the Mission Planner can either automatically update agent allocation or notify the human supervisor for further instruction.
Manage Communications
  This task monitors the "health" of the communications structure given different RF environments and monitors the communications traffic between agents. If an agent arrives at a target for which more information is desired, this MTC may allocate increased bandwidth to that agent to transmit more data about that target. If another agent maneuvers into an area of increased multi-path interference, the Mission Planner can modify the channel allocation to improve signal power from the agent.
Search Area
  This task is applies to the surveillance aspect of conducting a target engagement mission. The Search Area MTC can task an agent to conduct a defined search path through a predefined area of interest concurrent with that agent's capabilities as defined in the Agent Capabilities Database.
Pursue Target
  This task applies to an agent that is not in the vicinity of the target but the target's location relative to the agent is known. The Pursue Target MTC can task an agent to direct its course toward the target's estimated location and navigate to the location.
Geolocate Target
  This task applies to an agent that is in the vicinity of the target and is able to collect data on the target. The agent can apply onboard sensors to the target to collect positioning, state, or feature data for the target and provide the collected data to other agents and the Mission Planner.

In accordance with certain embodiments, the Task Allocation Module manages the execution of the collaborative engagement mission and assigns MTCs to appropriate agents given their capabilities. The Task Allocation Module can also allocate a sequence of multiple MTC tasks, as long as the assigned agent's capabilities support those tasks. The DDF algorithms, which can include a state machine on each agent, can support sequential execution of tasks with gating criteria to execute subsequent tasks. The Task Allocation Module can provide data to the MPC SA server, which can then provide information to the ARDEC architecture nodes as described above. This allows feedback to the ARDEC system for monitoring, situational awareness, and display.

Mission Task Component Functional Architecture

While the Mission Planner architecture provides a high-level view of the management of the overall collaborative engagement mission, functional state diagrams and a description of each MTC are provided below regarding software module design. The set of functions to accomplish a mission encompass the execution of simultaneous tasks as well as sequential tasks. While some tasks are executed independently, other tasks require collaboration with other unmanned vehicle agents. Tasks requiring collaboration among the unmanned vehicle agents are highlighted.

The Manage Agent Resources MTC and the Manage Communications MTC have common aspects relevant to the management of the overall system, independent of the specific mission to be executed. The functional architecture is primarily defined by the Mission Planner. The remaining three MTCs are specific for performing a target engagement mission and can therefore be more complex. The illustrated functional flow block architectures for these tasks define required functions among the unmanned vehicles and supervisory operator.

Figure 11:
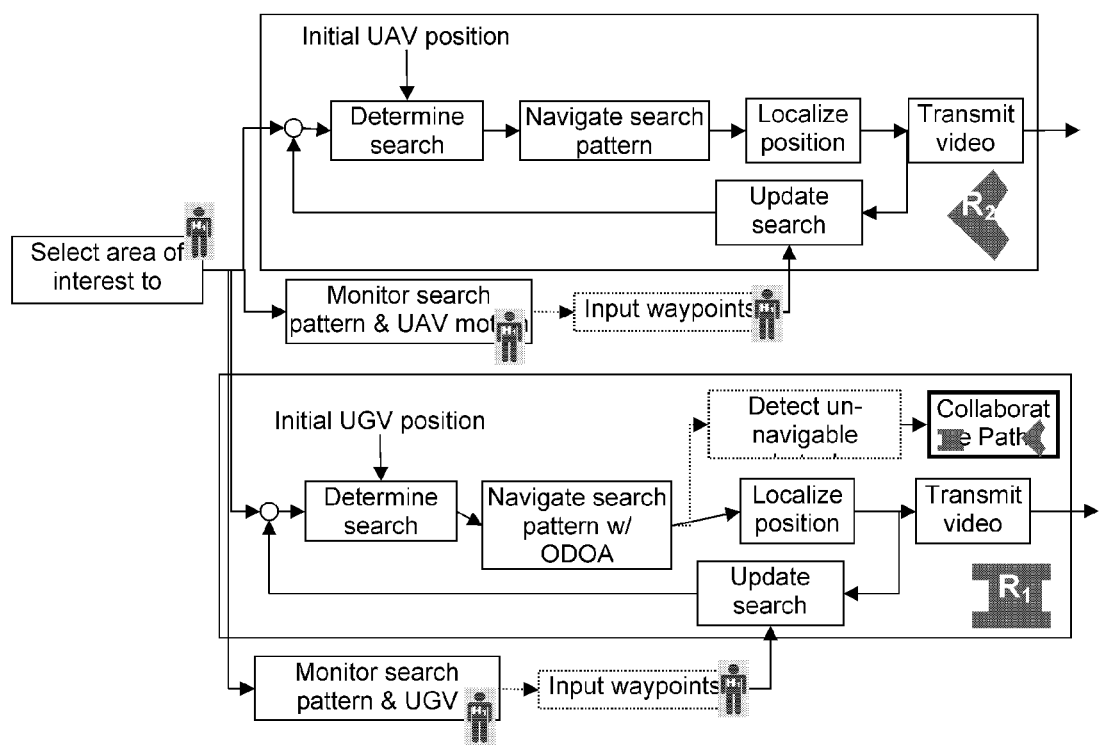
FIG. 11 illustrates an exemplary Search Area Mission Task Component.

A Search Area MTC embodiment illustrated in FIG. 11 begins with selection of an area of interest from the supervisory operator. Depending on the positions and capabilities of the unmanned vehicles, either one type of unmanned vehicle or both types of unmanned vehicles can be assigned by the Mission Planner to search the area. The upper block specifies the Search Area MTC functions to be performed by a UAV, and the lower block specifies the Search Area MTC functions to be performed by a UGV. There can be significant functional similarities between the air and ground unmanned vehicles. One exception is that the UGV will more often encounter unanticipated obstacles. Thus, while the UGV will navigate with an on-board road network map, live conditions may include additional obstacles such as road traffic, crowds, rubble piles, etc., which the UGV will have to circumnavigate. This may not occur in every mission, and therefore the circumnavigation function is represented by a non-solid line. The follow-on task for circumnavigation is a collaborative task, Collaborate Path. This task has a bolded border to indicate that it has a separate functional block architecture, described below, which involves other agents aiding the UGV to navigate and re-route its path. In addition, the supervisory operator will monitor the unmanned agents' actions as they maneuver through their search patterns. The supervisor can, at any time, input waypoints to update the search pattern for any of the unmanned vehicles.

Figure 12:
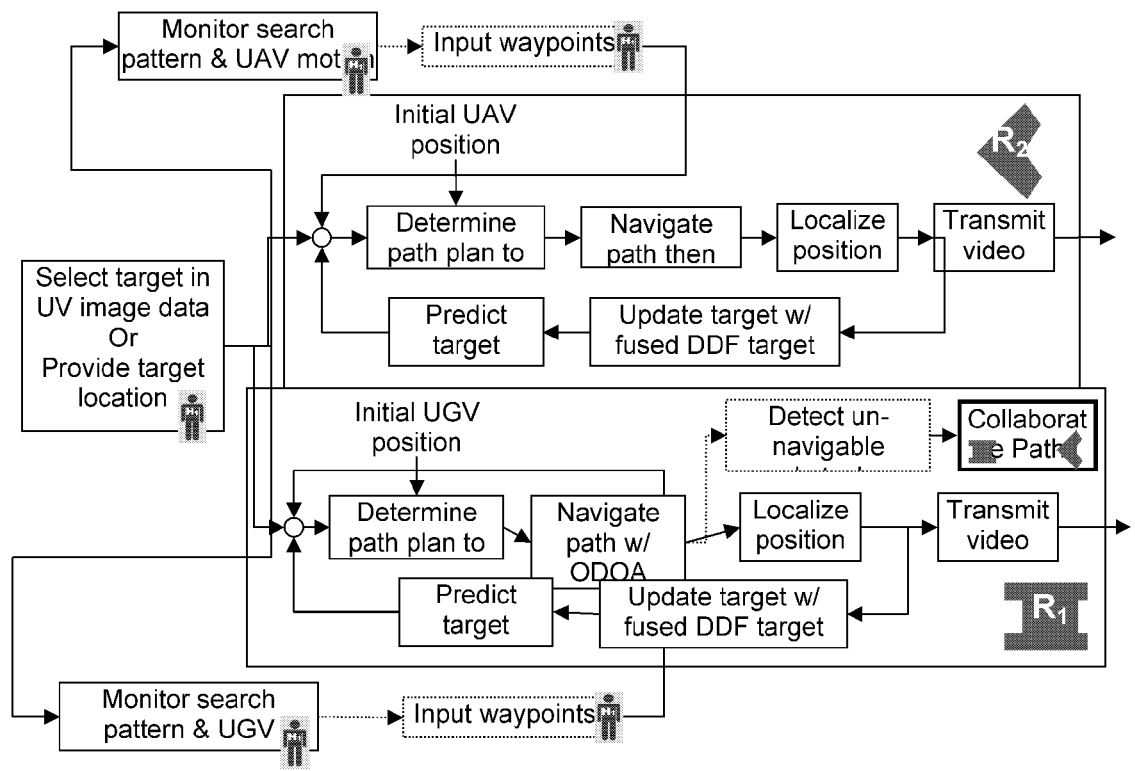
FIG. 12 illustrates an exemplary Pursue Target Mission Task Component.

A Pursue Target MTC embodiment is illustrated in FIG. 12 and has a layout that is similar to the Search Area MTC. Initially, either (1) the target location is known by intelligence and the operator manually provides the target coordinates, or (2) the target is detected by the operator when viewing available image data and the operator selects the target to pursue. To pursue a target, each assigned unmanned vehicle (UAV functions are depicted in the upper box and UGV functions are depicted in the lower box) does not need to have the target of interest in its field of view. Rather, if the target is not in its field of view, it can find a path from its position to the target's estimated position, which can be provided by the fused DDF target track position from its neighboring DDF nodes. The fused DDF track can be generated by all available sensor measurements and intelligence on the target.

Figure 13:
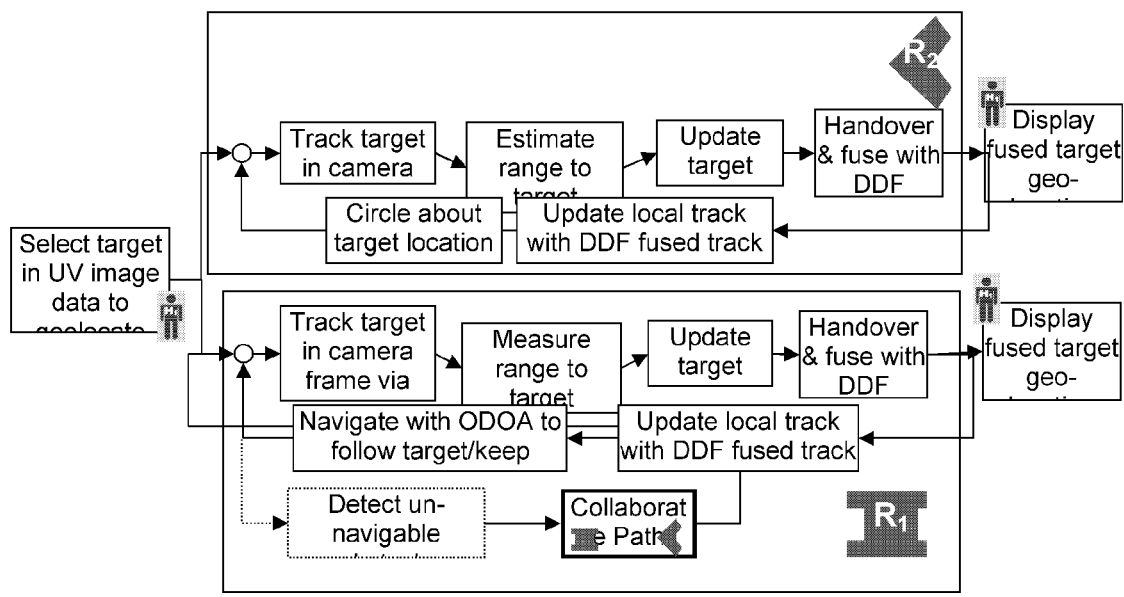
FIG. 13 illustrates an exemplary Geolocate Target Mission Task Component.

A Geolocate Target MTC embodiment is illustrated in FIG. 13 and has the highest number of tasks requiring collaboration and, therefore, the highest number of DDF software modules. The task of target selection is executed by the supervisory operator, denoted by the human icon. Target detection can occur in a different MTC, such as Pursue Target, but this function is addressed here for completeness in the event that other MTCs were not executed beforehand. The Mission Planner can assign available unmanned vehicles to geolocate a target if the target of interest is in the unmanned vehicle's camera view. If the Mission Planner designates a UAV to execute this MTC, then the sequence of tasks in the upper box is followed. The UGV sequence of tasks for geolocating a target are set forth in the lower box. Once the target of interest is specified in an image, the UGV can maintain track on the image in the 2D camera coordinate frame using, for example, Hough transforms, hysteresis and time-averaged correlation.

In certain embodiments of the present teachings, the UGV comes to a stop to eliminate noise before its on-board laser ranger or other functionality is able to accurately measure the range to the target. This range measurement is correlated with angle measurements from the image to estimate the target's position. A transformation to geocoordinates is calculated, and the target's track state can be either initialized or updated with this estimate. The UGV can then transmit information to the other DDF nodes, including to the operator's Supervisor OCU for displaying the target's updated track state. A fusion step can occur across all DDF nodes and the updated and integrated DDF fused track state can update the UGV's local track. The UGV can then rely on this updated fused track for directing the camera's pointing angle, for example via a pan/tilt mechanism, to ensure camera coverage of the target. If necessary, the UGV can navigate and pursue the target to maintain target ranging and observations. If the UGV, while in pursuit of the target, arrives at an obstacle that its obstacle detection/obstacle avoidance (ODOA) algorithm is unable to circumnavigate, the UGV can initiate the Collaborate Path DDF task to elicit aid from neighboring unmanned vehicle agents.

Figure 14:
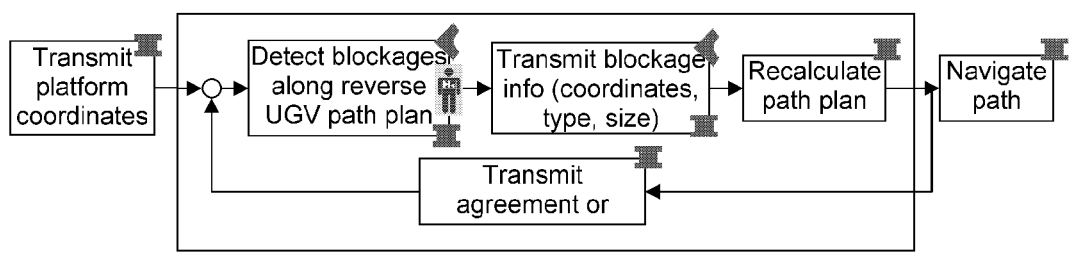
FIG. 14 illustrates an exemplary Collaborate Path task.

The Collaborate Path task, an embodiment of which is illustrated in FIG. 14, can be instantiated when a UGV automatically determines that it cannot execute a planned path due to an unanticipated blockage that it cannot circumnavigate. The UGV transmits a coded message to other DDF node agents seeking assistance. The other DDF nodes are able to determine which agent is best positioned to provide aid. This assisting agent can either be a UAV or UGV, which maneuvers toward the agent needing assistance. Assistance can include, for example, providing additional information regarding the size and location of the blockage, as well as alternative navigation routes. The present teachings contemplate a variety of techniques for detecting obstacles in the UGV's path. For example, imagery can be used by the operator to select obstacles that the blocked UGV should take into account. Alternatively or additionally, more sophisticated sensors and obstacle discrimination algorithms can automatically detect and recognize obstacles and provide blockage information, including geo-coordinates of the blockage, the type of blockage, the size of the blockage, etc.

When available, operator-selected obstacles from the image data can be converted to geo-coordinates. The geo-coordinates allow the obstructed UGV to recalculate its path plan. If the UGV is unable to reach a viable path plan solution, it can transmit a correction message to an assisting agent which can then continue maneuvers to provide additional blockage information. If the obstructed UGV is able to navigate with the revised path plan, it can transmit a message to the assisting agent indicating that it has successfully determined a revised route or cleared the obstruction.

Because the system architecture embodiment described herein provides the Mission Planner CE node at a high level— at the local nodes—the unmanned vehicle agents may take on low-level tasks in a decentralized fashion. The DDF nodes support autonomous collaboration for targeting, and can provide significant performance for target localization while keeping processing and bandwidth utilization at easily manageable levels.

Decentralized Data Fusion (DDF)

A decentralized data fusion network consists of a network of sensing nodes, each with its own processing facility, which do not require any central fusion or central communication facility. In various embodiments of the present teachings, the sensing nodes are all components containing DDF nodes, which include the OCUs and the unmanned vehicle platforms. In such a network, fusion occurs locally at each node on the basis of local observations and the information communicated from neighboring nodes. A decentralized data fusion network is characterized by three constraints:

1. No one node should be central to the successful operation of the network.
2. Nodes cannot broadcast results and communication must be kept on a strictly node-to-node basis,
3. Sensor nodes do not have any global knowledge of sensor network topology, and nodes should only know about connections in their own neighborhood.

The constraints imposed provide a number of important characteristics for decentralized data fusion systems. Eliminating a central node and any common communication facility ensures that the system is scalable as there are no limits imposed by centralized computational bottlenecks or lack of communication bandwidth. Ensuring that no node is central and that no global knowledge of the network topology can allow fusion results in the system to survive the loss or addition of sensing nodes. The constraints also make the system highly resilient to dynamic changes in network structure. Because all fusion processes must take place locally at each sensor site through a common interface and no global knowledge of the network is required, nodes can be constructed and programmed in a modular reconfigurable fashion. Decentralized network are typically characterized as being modular, scalable, and survivable.

Figure 15:
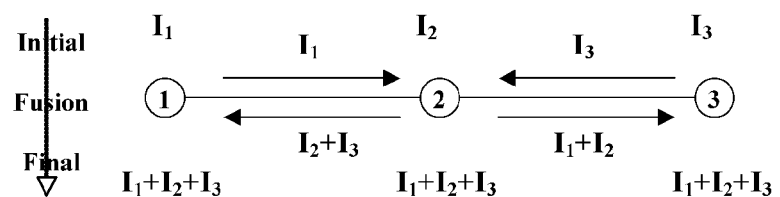
FIG. 15 illustrates an exemplary network fusion by propagating inter-node differences.

The DDF fusion architecture implements decentralized Bayesian estimation to fuse information between DDF nodes. Decentralized estimation schemes are derived by reformulating conventional estimators such as Kalman filters in Information or log-likelihood form. In this form, the fusion operation reduces to summation of its information sources. For networked implementations, this summation can be performed in an efficient decentralized manner by passing inter-node state information differences. This concept is shown in FIG. 15, which illustrates network fusion by propagating inter-node differences.

The higher number of fusion iterations and the more frequent this synchronization occurs, the more agents that share a common map with all the known target locations. The tempo of mission events, namely the speed at which a target or agents move, will impact the commonality of each platform's known locations of all participants in the mission.

In accordance with certain embodiments, the functional blocks required to implement this fusion process consist of sensor pre-processing, local state estimation, and inter-node DDF communication management. When actuation or mode selection that affects the sensor measurement quality is available, an additional control block is appropriate to direct sensing resources. These elements and their connections are shown in FIG. 16.

Figure 16:
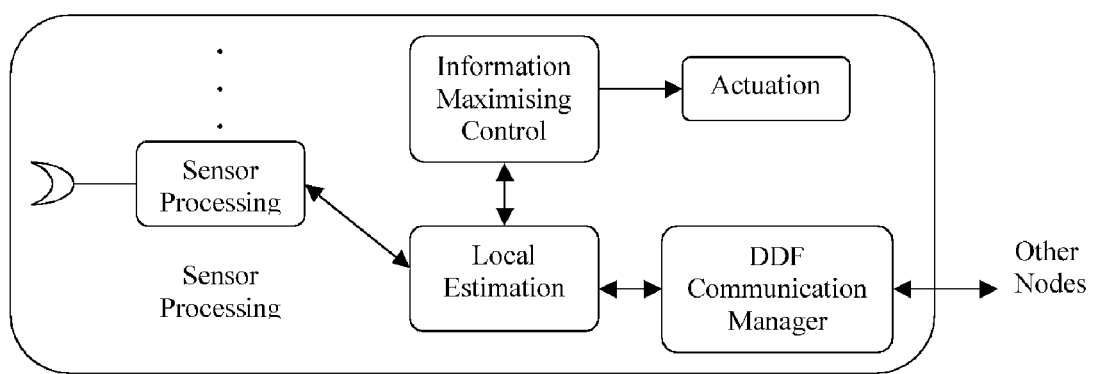
FIG. 16 illustrates functional blocks required to implement fusion.

Each of the blocks illustrated in FIG. 16 is implemented as one or more software components that can communicate through standard network and inter-process protocols. The result is a highly flexible and reconfigurable system architecture. Component modules can be located and connected in a customizable manner that delivers the most appropriate system configuration. Examples include small expendable UAVs with limited computing power. A DDF structure can connect processed sensor and actuation signals wirelessly to a remote processor for processing, estimation, and control.

Figure 18:
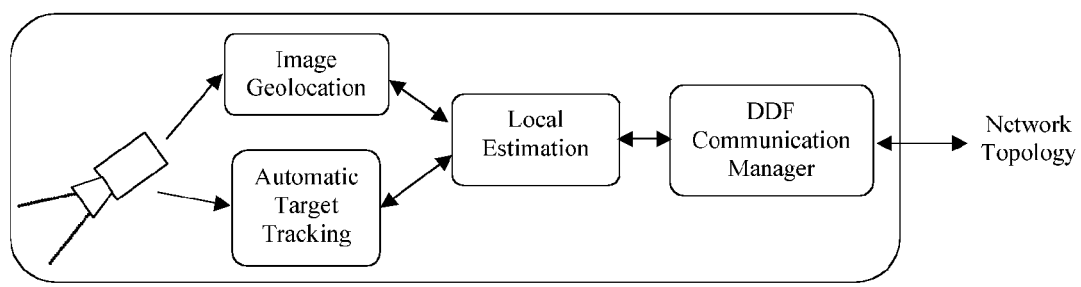
FIG. 18 illustrates an exemplary embodiment of a decentralized fusion node for an unmanned vehicle agent.

The DDF network integrates multiple estimates from multiple vehicles in a way that is simple, efficient, and decentralized. A decentralized fusion node for an unmanned vehicle agent is illustrated in FIG. 18. For every sensor, there is a DDF node with appropriate functional elements. Each node maintains a local estimate for the state of the target vehicle, which can include the target vehicle's position, its velocity, and other identifying information. When all nodes are connected to the network and there are a low number of nodes, a DDF Communication Manager can follow a simple rule: at every time step, each node communicates both updates to the local estimate state as well as uncertainty to its neighbors. These changes propagate through the network to inform all nodes on the connected network using peer-to-peer communication.

In general the network may experience changes in connectivity over time. Consistently handling changes in network and node connectivity requires more complex DDF communication management. Upon establishing a connection, each node performs an additional operation to determine estimate information shared in common with the new neighbor node. Exchanges in the local node's estimates are aggregated without double counting.

Collaborative Target Tracking Applied to Mission Task Components

In certain implementations of the present teachings, the operator utilizes the Supervisor OCU to manually detect one or more targets in received video data. In such implementations, the operator is relied on for target detection due to the large variety of adversary types that might need to be detected, as well as the broad range of backgrounds from which targets need to be identified. Once detected, the low-level task of tracking the target can be automated with software. Target tracking in EO and IR imagery, from one or more UAVs and/or one or more UGVs can utilize an algorithm that maintains an adaptive classifier separating the target from its background. The classifier decides which pixels belong to target, and which pixels belong to the background and is updated iteratively using a window around the target's current location. If the system is in danger of losing the target, either due to a potential for occlusion by known buildings or because the target becomes harder to distinguish from the background or other targets, the system can alert the operator that assistance is required. The goal is to minimize the amount of operator assistance necessary.

Approximate geolocation from UGVs can be estimated from heading and position information, as well as estimated pointing information from Pan-Tilt-Zoom cameras. Due to a dependence on the attitude of the vehicle, geolocation from UAV video can be more difficult without certain inertial systems or gimbaled cameras. Alternatively, geolocation for UAVs can be implemented by matching frames from UAV video to previously acquired aerial imagery, such as from recent satellite imagery. For a given area, a library of feature descriptors (e.g., large visible landmarks) is constructed. For each received image, feature detection is performed, the library is queried, and a location on the ground best matching the query image is chosen.

Failure detection, image stabilization, and improvements to operator target track initialization can improve target tracking performance for the unmanned vehicle agents. If target tracking is initialized by the operator with an over-sized image region, the tracker may confuse target characteristics with image background characteristics, leading to track loss. An under-sized image region may cause the tracker to reject or fail to incorporate certain target characteristics, which could result in tracking failure. Properly sizing of the tracker initialization region can be achieved in a variety of ways, including by operator training. In certain embodiments, and particularly for UAV tracking, utilizing both motion-based tracking and color-based tracking can improve overall tracking success for the system.

In certain embodiments of the present teachings, during a Pursue Target MTC, a DDF Estimation System uses measurements from ground and aerial agents to localize the target and then disseminates the target location information to be acted upon by the system's Collaborative Path planning systems. In various embodiments, the operator begins by designating where to look for targets, for example by drawing on a map displayed on the Supervisor OCU. The unmanned vehicle agents can then converge on the area, and the operator may, for example, choose to detect a target on the UAV video. The UAV DDF node's Automatic Target Tracking could then take over and track the target's position in the video. Several seconds later, a unique landmark in the scene can be found which uniquely identifies the area, so that the target location at that time can be geolocated. At this point, an estimate of the target's coordinate position is known. The Mission Planner can then initiate pursuit by unmanned vehicle agents (e.g., one or more UGVs) using the estimated position. Once in pursuit or when the target is in view, the one or more UGVs can provide their own estimates of the target's position. When these estimates become available, an ad-hoc network can be formed among the nodes, and DDF can take over aggregating the estimates into a single minimum variance estimate. During surveillance, if the original UAV loses its video connection, available UGVs can maintain video surveillance and continue tracking and updating target position.

In a Collaborate Path MTC, the responsibilities of the Distributed Estimation System are largely the same as in Pursue Target MTC for detection, geolocation and tracking. The purpose is to geolocate obstacles on the ground that are selected by the operator. This task can be simplified by assuming that the ground obstacles are constrained to be stationary. The notable difference is the indication that these obstacles are not targets of interest—rather they are "repulsive" targets in which the automatic path planning scheme of the UGV will reroute its path plan to select roads that do not contain those obstacles.

Supervisor OCU Interface

The Supervisor OCU interface facilitates the operator's management, command and control, and monitoring of mission execution. In accordance with certain embodiments of the present teachings, the Supervisor OCU display interface provides the operator with an intuitive understanding of mission status and expected execution of future agent actions. The use of certain mixed initiative approaches, such as dynamically accepting different levels and frequencies of intervention, self-recognition of needing assistance, and sharing of decision-making at specific levels, can assist the operator in managing a multi-unmanned vehicle mission.

Figure 19:
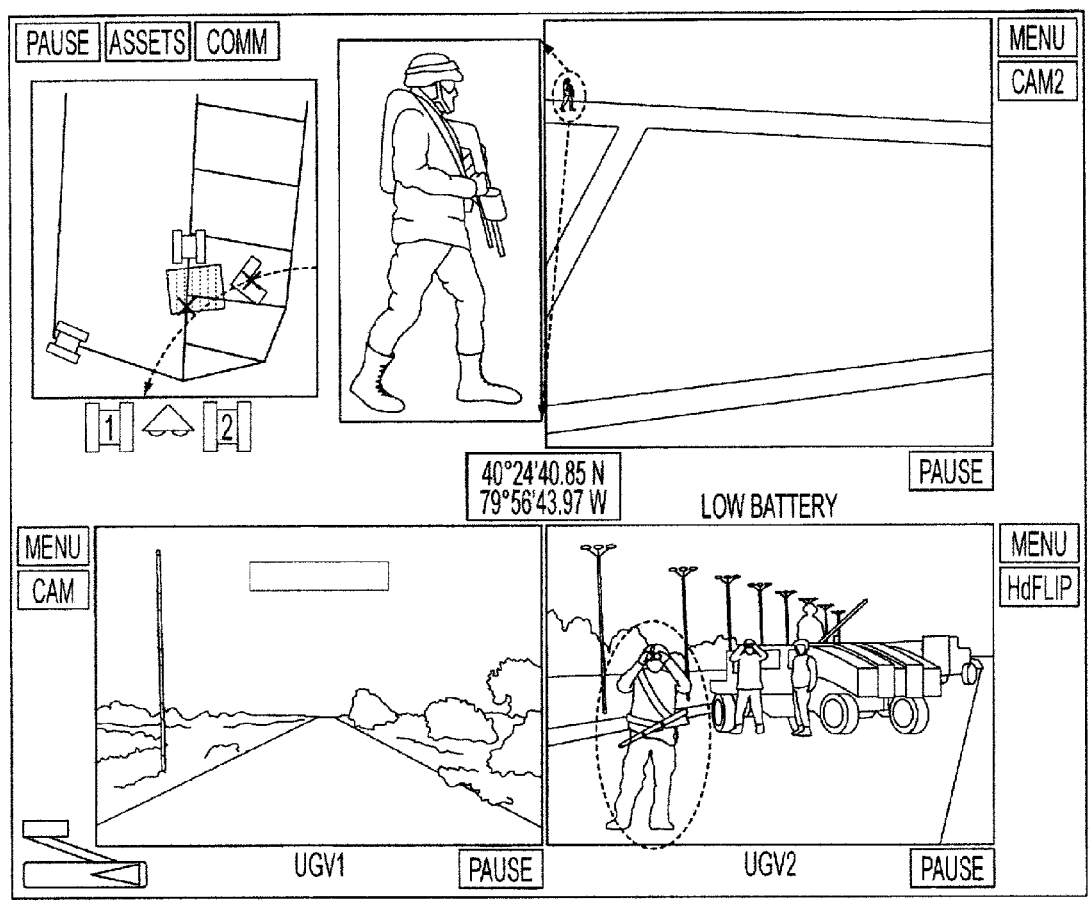
FIG. 19 illustrates an exemplary embodiment of a Supervisor OCU interface.

Many display components (video data, status bars, and control buttons) can be configurable and, in certain embodiments, allow "drag and drop" placement for ease of use. The Supervisor OCU interface, an exemplary embodiment of which is illustrated in FIG. 19, can facilitate operator waypoint input for the unmanned vehicles to redirect their routes, selecting a specific unmanned ground vehicle to teleoperate, "freezing" UGVs, and putting UAVs in a holding pattern. The illustrated interface allows the use of drag strokes to control aspects of the unmanned vehicles. The mapping of click-drag strokes in specific areas of the display interface can facilitate controls of different vehicles, injection of waypoints, camera controls, and head-neck controls. The icons below the map view in the upper left allow the operator to inject waypoints simply by selecting a vehicle and then placing waypoints directly onto the map.

In accordance with various embodiments, the Supervisor OCU interface facilitates operator injection of high-level mission goals through interaction with the Mission Planner CE in the upper left section of the display. For example, in the case of the Search Area MTC, it is important to be able to able to quickly specify the area in which the target should be located. This interface can allow the operator to draw a polygon on a street map designating the area to be searched. This interface can also allow the operator to cue targets in the video streams emanating from the unmanned vehicle agents. Once the target has been specified, the vehicles will track the target autonomously or semi-autonomously. The interface can also integrate directives from the operator that keep the vehicle from going into certain areas. For example, if the operator sees an area that is blocked, the area can be marked as a NO-GO region by, for example, drawing on the map. Path planning can then automatically reroute any plans that might have required navigation through those areas.

As can be seen, icons representing available unmanned vehicle agents can be utilized in the map (upper left corner of display) to indicate the appropriate location of the represented unmanned vehicle agent on the map. In certain embodiments, updates and track history can be properly registered to each unmanned vehicle agent.

In certain embodiments of the present teachings, when an identified target has entered a building and been followed by a UGV, one or more UAVs can be directed by the system to orbit the building containing the target and determine if and when the target exits the building. Additional UGVs may be patrolling the perimeter of the building on the ground. If and when the target exits the building, an orbiting UAV that discovers the exit can inform other agents of the exit. The UGV that followed the target into the building can then exit the building, attempt to obtain line-of-sight to the target, and again follow the target. While this is occurring, other unmanned vehicle team members collaborate to maintain line-of-sight with the exited target. Alternatively, another UGV could obtain line-of-sight to the target and begin following the target, in which case the system may or may not instruct the original UGV to also find and follow the target, depending on mission parameters and/or operator decision making.

Other embodiments of the present teachings will be apparent to those skilled in the art from consideration of the specification and practice of the present teachings disclosed herein. For example, the present teachings could be used for long-term planning (e.g., the horizon for planning spans over minutes rather than seconds) in addition to short-term planning. It is intended that the specification and examples be considered as exemplary only.

What is claimed is:

1. A collaborative engagement system comprising:
   at least two unmanned vehicles comprising an unmanned air vehicle including sensors configured to locate a target and an unmanned ground vehicle including sensors configured to locate and track a target; and
   a controller facilitating control of, and communication and exchange of data to and among the unmanned vehicles, the controller facilitating data exchange via a common protocol;
   wherein the collaborative engagement system controls the unmanned vehicles to maintain line-of-sight between a predetermined target and at least one of the unmanned vehicles, geolocating the predetermined target with the unmanned air vehicle and transmitting information regarding the position of the unmanned air vehicle and information regarding a position of the target relative to the unmanned air vehicle to the unmanned ground vehicle so that the unmanned ground vehicle can do path planning based on a geolocation of the target, and
   wherein updated information regarding target position is sent to the unmanned ground vehicle at predetermined intervals.

2. The system of claim 1, wherein the controller is an operator control unit.

3. The system of claim 2, wherein an operator identifies the predetermined target via the operator control unit.

4. The system of claim 1, wherein, when a first unmanned vehicle has line-of-sight to the predetermined target, another unmanned vehicle utilizes information regarding the position of the first unmanned vehicle and information regarding a position of the target relative to the first unmanned vehicle to plan a path to reach a position that has or will have line-of-sight to the predetermined target.

5. The system of claim 4, wherein the position that has or will have line-of-sight to the predetermined target takes into account a projected path of the target.

6. A collaborative engagement system comprising:
   at least two unmanned vehicles comprising an unmanned air vehicle including sensors configured to locate a target and an unmanned ground vehicle including sensors configured to locate and track a target; and
   a controller facilitating control of, and communication and exchange of data to and among the unmanned vehicles, the controller facilitating data exchange via a common protocol,
   wherein the collaborative engagement system controls the unmanned vehicles to maintain line-of-sight between a predetermined target and at least one of the unmanned vehicles, and
   wherein the unmanned air vehicle orbits a building containing the predetermined target and determines if the predetermined target exits the building.

7. The system of claim 6, wherein the unmanned air vehicle sends information regarding predetermined target building entry and exit to one or more unmanned ground vehicles that can surround and/or enter the building to follow the predetermined target.

8. A collaborative engagement system comprising:
- at least two unmanned vehicles comprising an unmanned air vehicle including sensors configured to locate a target and an unmanned ground vehicle including sensors configured to locate and track a target; and
- a controller facilitating control of, and communication and exchange of data to and among the unmanned vehicles, the controller facilitating data exchange via a common protocol,
- wherein the collaborative engagement system controls the unmanned vehicles to maintain line-of-sight between a predetermined target and at least one of the unmanned vehicles using waypoint navigation.

9. The system of claim 1, wherein the system controls the unmanned vehicles to obtain or maintain line-of-sight using path planning.

10. A collaborative engagement system comprising:
- at least two unmanned vehicles comprising an unmanned air vehicle including sensors configured to locate a target and an unmanned ground vehicle including sensors configured to locate and track a target; and
- a controller facilitating control of, and communication and exchange of data to and among the unmanned vehicles, the controller facilitating data exchange via a common protocol,
- wherein the collaborative engagement system controls the unmanned vehicles to maintain line-of-sight between a predetermined target and at least one of the unmanned vehicles using an object avoidance behavior.

11. The system of claim 1, wherein the system allows operator override to control the unmanned vehicles.

12. The system of claim 11, wherein the system allows the operator to override waypoint navigation.

13. The system of claim 11, wherein the system controls the unmanned vehicles to assist the operator in searching for a target.

14. The system of claim 13, wherein the operator designates an area in which the unmanned vehicles navigate to assist the operator in searching for a target.

* * * * *